US012697856B2

(12) United States Patent
Allgaeuer et al.

(10) Patent No.: US 12,697,856 B2
(45) Date of Patent: Aug. 4, 2026

(54) THERMAL MANAGEMENT SYSTEM FOR A MOTOR VEHICLE

(71) Applicant: Bayerische Motoren Werke Aktiengesellschaft, Munich (DE)

(72) Inventors: Christian Allgaeuer, Munich (DE); Felix Artmeier, Munich (DE); Simon Eglseer, St. Pantaleon-Erla (AT); Stefan Hofmanninger, Weibern (AT); Oliver Horn, Munich (DE); Alexander Lichtenberger, St. Peter in der Au (AT); Patrick Marinell, Munich (DE); Rene Pichlbauer, Sankt Marien (AT); Andreas Siuka, Kematen an der Krems (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 102 days.

(21) Appl. No.: 18/689,305

(22) PCT Filed: Sep. 14, 2022

(86) PCT No.: PCT/EP2022/075472
§ 371 (c)(1),
(2) Date: Mar. 5, 2024

(87) PCT Pub. No.: WO2023/061685
PCT Pub. Date: Apr. 20, 2023

(65) Prior Publication Data
US 2024/0383314 A1     Nov. 21, 2024

(30) Foreign Application Priority Data

Oct. 13, 2021   (DE) ..................... 10 2021 126 454.5
Oct. 26, 2021   (DE) ..................... 10 2021 127 770.1

(51) Int. Cl.
*B60H 1/32* (2006.01)
*B60H 1/00* (2006.01)

(52) U.S. Cl.
CPC ..... *B60H 1/32284* (2019.05); *B60H 1/00278* (2013.01); *B60H 1/00885* (2013.01); *B60H 2001/00307* (2013.01)

(58) Field of Classification Search
CPC ............ B60H 1/00278; B60H 1/00885; B60H 1/32284; B60H 2001/00307
See application file for complete search history.

(56) References Cited

U.S. PATENT DOCUMENTS

2020/0298657 A1*   9/2020   Allgaeuer .......... B60H 1/00007
2020/0298662 A1   9/2020   Herbolzheimer et al.
(Continued)

FOREIGN PATENT DOCUMENTS

DE     10 2019 107 193 A1     6/2020
DE     10 2019 132 688 A1     6/2020
(Continued)

OTHER PUBLICATIONS

EP 3711983 (English Translation) (Year: 2020).*
(Continued)

*Primary Examiner* — Jonathan Bradford
(74) *Attorney, Agent, or Firm* — Crowell & Moring LLP

(57) ABSTRACT

A thermal management system for a motor vehicle, includes a cooling circuit in which a cooler, a cooling circuit pump, and a first heat source are connected in series; a battery branch, in which a chiller and a traction battery are connected in series; a first connection which is arranged downstream of the first heat source, at which coolant can be selectively introduced into the battery branch; a second connection, which leads from the battery branch to a point of the cooling circuit upstream of the first heat source, (Continued)

further comprising a condenser branch that runs between the second connection and the first connection, wherein the condenser branch has a liquid cooled condenser.

14 Claims, 20 Drawing Sheets

(56)　　　　　　References Cited

U.S. PATENT DOCUMENTS

| | | |
|---|---|---|
| 2020/0298663 A1 | 9/2020 | Allgaeuer et al. |
| 2021/0252940 A1* | 8/2021 | Heyl ................. B60H 1/32284 |
| 2022/0185072 A1 | 6/2022 | Frank |

FOREIGN PATENT DOCUMENTS

| | | |
|---|---|---|
| DE | 10 2019 120 229 A1 | 1/2021 |
| DE | 10 2019 132 689 A1 | 6/2021 |
| EP | 3 711 983 A1 | 9/2020 |

OTHER PUBLICATIONS

International Search Report (PCT/ISA/210) issued in PCT Application No. PCT/EP2022/075472 dated Jan. 5, 2023 with English translation (6 pages).
German-language Written Opinion (PCT/ISA/237) issued in PCT Application No. PCT/EP2022/075472 dated Jan. 5, 2023 with English translation (8 pages).
German-language Search Report issued in German Application No. 10 2021 127 770.1 dated Jul. 14, 2022 with partial English translation (11 pages).
Korean-language Office Action issued in Korean Application No. 10-2024-7001647 dated Aug. 29, 2025 with English translation (10 pages).

* cited by examiner

THERMAL MANAGEMENT SYSTEM FOR A MOTOR VEHICLE

BACKGROUND AND SUMMARY

The invention relates to a thermal management system having a temperature-control circuit and a coolant circuit interacting therewith. The thermal management system serves to control the temperature of vehicle components and to control the temperature of a vehicle passenger compartment. The invention also relates to a motor vehicle having such a thermal management system.

EP 3 711 983 A1 discloses a thermal management system according to the present disclosure. In the case of this thermal management system, the vehicle passenger compartment is heated by means of a heat pump function via a condenser 42 and an electrical auxiliary heater 46. A high-voltage store 16 is heated for example via inefficient operation (trimming) of a drive motor 24. To heat the high-voltage store via the electric auxiliary heater 46 or the heat pump function, flow must pass through a cooler 26, which can lead to losses of heat to the surrounding area. This can in turn lead to losses in terms of efficiency and heating power.

An object of the present invention is therefore to at least partially overcome the aforementioned drawback. This object is achieved by a thermal management system according to the present disclosure and by a motor vehicle according to the present disclosure. The present disclosure also includes advantageous developments of the invention.

One exemplary embodiment of the invention provides a thermal management system for a motor vehicle, comprising a cooler circuit which connects a cooler, a cooler circuit pump and a first heat source in series; a battery line, which connects a chiller and a traction battery in series, wherein a refrigerant circuit can flow through the chiller fluidically separately from the battery line; a first connection, which is arranged in the cooler circuit downstream of the first heat source and upstream of the cooler, wherein coolant can be introduced selectively into the battery line at the first connection by a first valve device; a second connection, which leads from the battery line to a point of the cooler circuit downstream of the cooler and upstream of the first heat source, which has a second valve device to which selectively the battery line and the cooler circuit can be fluidically connected and/or the chiller and the traction battery can be connected to form a ring-like battery circuit; and a third connection between the battery line and the cooler circuit, wherein the chiller is arranged in the battery line between the first connection and the third connection. The thermal management system is also fitted with a condenser line, which extends between the second connection and the first connection, wherein the condenser line comprises a condenser and the refrigerant circuit can also flow through the condenser fluidically separately from the condenser line. This modified incorporation of the liquid-cooled condenser makes it possible to directly heat the traction battery, circumventing the cooler. It is also possible to efficiently heat the vehicle passenger compartment using a heat pump functionality. This results in improvements in terms of the efficiency and advantages in terms of heating power.

According to another exemplary embodiment of the invention, the condenser line extends between the second connection and the first connection, circumventing the first heat source. In particular, the condenser line is connected in parallel with respect to the first heat source. This opens up additional operating modes, since flow can pass through the condenser line and the first heat source independently of one another.

According to another exemplary embodiment of the invention, it is possible to set a flow through the condenser line by a flow control valve or the first valve device.

According to another exemplary embodiment of the invention, the thermal management system is also fitted with a line which extends parallel to the condenser line between the second connection and the first connection, circumventing the first heat source, wherein a second heat source is arranged in this further line. The incorporation of the second heat source in a different line than the first heat source makes it possible to specifically address the temperature-control requirements of the individual heat sources.

According to another exemplary embodiment of the invention, the battery line comprises a heat source between the first connection and the chiller.

According to another exemplary embodiment of the invention, the battery line comprises a heat source between the third connection and the traction battery.

According to another exemplary embodiment of the invention, a heating heat exchanger is arranged in the condenser line. As a result, the condenser line also acts as a heating line for heating a vehicle passenger compartment.

According to another exemplary embodiment of the invention, the thermal management system also has a battery bypass line, which branches off from the battery line, circumvents the traction battery, and leads back into the battery line. This makes it possible to produce operating states in which flow passes through the battery line, but traction battery is circumvented.

According to another exemplary embodiment of the invention, the thermal management system also has a chiller bypass line, which branches off from the battery line upstream of the chiller and leads back into the battery line downstream of the chiller. As a result, in operating states in which the chiller is not required, it is possible to avoid hydraulic pressure losses through the chiller or prevent losses of heat to the cooling circuit if the chiller cannot be shut off at the refrigerant side.

According to another exemplary embodiment of the invention, the second connection also comprises a connecting line, which is attached directly to the second valve device and leads to the point on the cooler circuit downstream of the cooler and upstream of the first heat source.

According to another exemplary embodiment of the invention, the condenser line branches off from the connecting line.

According to another exemplary embodiment of the invention, the thermal management system is also fitted with a LT cooler, a feed line of which branches off from the cooler circuit and the discharge line of which opens into the connecting line, wherein a one-way valve which prevents a flow from the cooler circuit into the connecting line is arranged in the connecting line between this opening and the cooler circuit. The LT cooler makes it possible to reduce the inlet temperature of the downstream components.

According to another exemplary embodiment of the invention, the condenser line is attached directly to the second valve device and the second valve device has a switching position in which the connecting line and the condenser line are shut off at the same time. This makes it possible to save on a one-way valve, because a backflow in certain operating states is prevented by the valve-side shut-off device.

According to another exemplary embodiment of the invention, the second valve device has at least three switching positions, wherein in a first switching position the chiller and the traction battery can be connected to form the battery circuit in a closed ring, in a second switching position the battery line is fluidically connected to the condenser line and the connecting line is shut off, and in a third switching position the battery line is fluidically connected to the condenser line and the connecting line at the same time.

The invention also provides a motor vehicle having such a thermal management system.

Preferred exemplary embodiments of the present invention will be described below with reference to the appended drawings.

DETAILED DESCRIPTION OF THE DRAWINGS

The refrigerant circuits and temperature-control circuits of the thermal management system according to the present disclosure that are explained below can be installed individually or in combination in a motor vehicle, in particular a passenger car, for example an electric vehicle, which is not illustrated.

Figure 1:
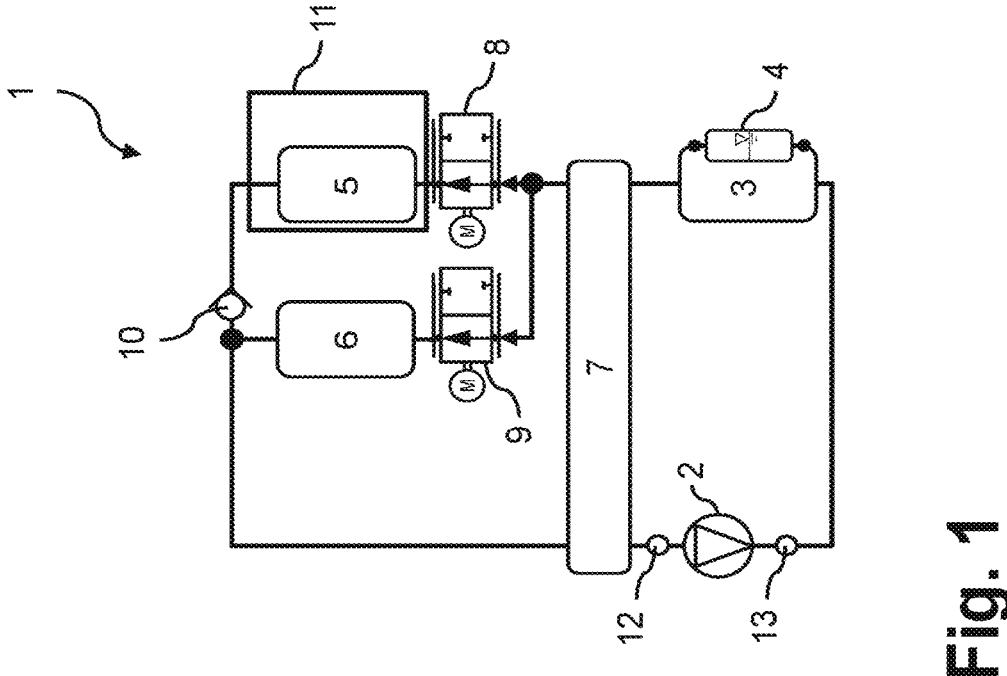
FIG. 1 schematically shows a first embodiment of a refrigerating circuit.

FIG. 1 schematically shows a first embodiment of a refrigerating circuit 1. The refrigerating circuit 1 comprises a refrigerant compressor 2, a condenser 3 with a liquid collector 4, an air-conditioning evaporator 5, a chiller 6 and an internal heat exchanger 7. An evaporator valve 8 and a chiller valve 9 are also provided. These valves 8 and 9 are adapted to (partially or completely) prevent or allow a throughflow. They also act as expansion members in the partially open state.

The air-conditioning evaporator 5 and the chiller 6 are connected in parallel with respect to one another. More specifically, a series connection of the evaporator valve 8, the air-conditioning evaporator 5 and a one-way valve 10, or non-return valve, is arranged in parallel with respect to a series connection of the chiller valve 9 and the chiller 6. The stated elements are arranged in the respective series connection in the stated order, in particular in the direction of flow.

A refrigerant, for example R134a, R1234yf, R290, R744 or the like circulates in the refrigerating circuit 1, in particular through the components of the refrigerating circuit 1.

In the refrigerating circuit 1, the refrigerant compressor 2, the condenser 3, and the parallel connection of the air-conditioning evaporator 5 and the chiller 6 are connected in series. In particular, the stated components are connected in series in a closed ring in this order, as seen in the direction of flow of the refrigerant.

The air-conditioning evaporator 5 is in particular an air-liquid heat exchanger, through which the refrigerant can flow and which is arranged in an air-conditioning unit 11. More specifically, the air-conditioning evaporator 5 is arranged in an air guide of the air-conditioning unit 11, via which air (external air or ambient air) can be fed to a vehicle passenger compartment so that this air can be temperature-controlled, in particular cooled, by the air-conditioning evaporator 5.

Refrigerant and coolant in the temperature-control circuit, which is explained later on, can flow through the condenser 3. Here, the refrigerant and the coolant are fluidically separate from one another and exchange heat with one another in the condenser 3. The condenser 3 is therefore what is referred to as a liquid-cooled condenser.

Figure 5:
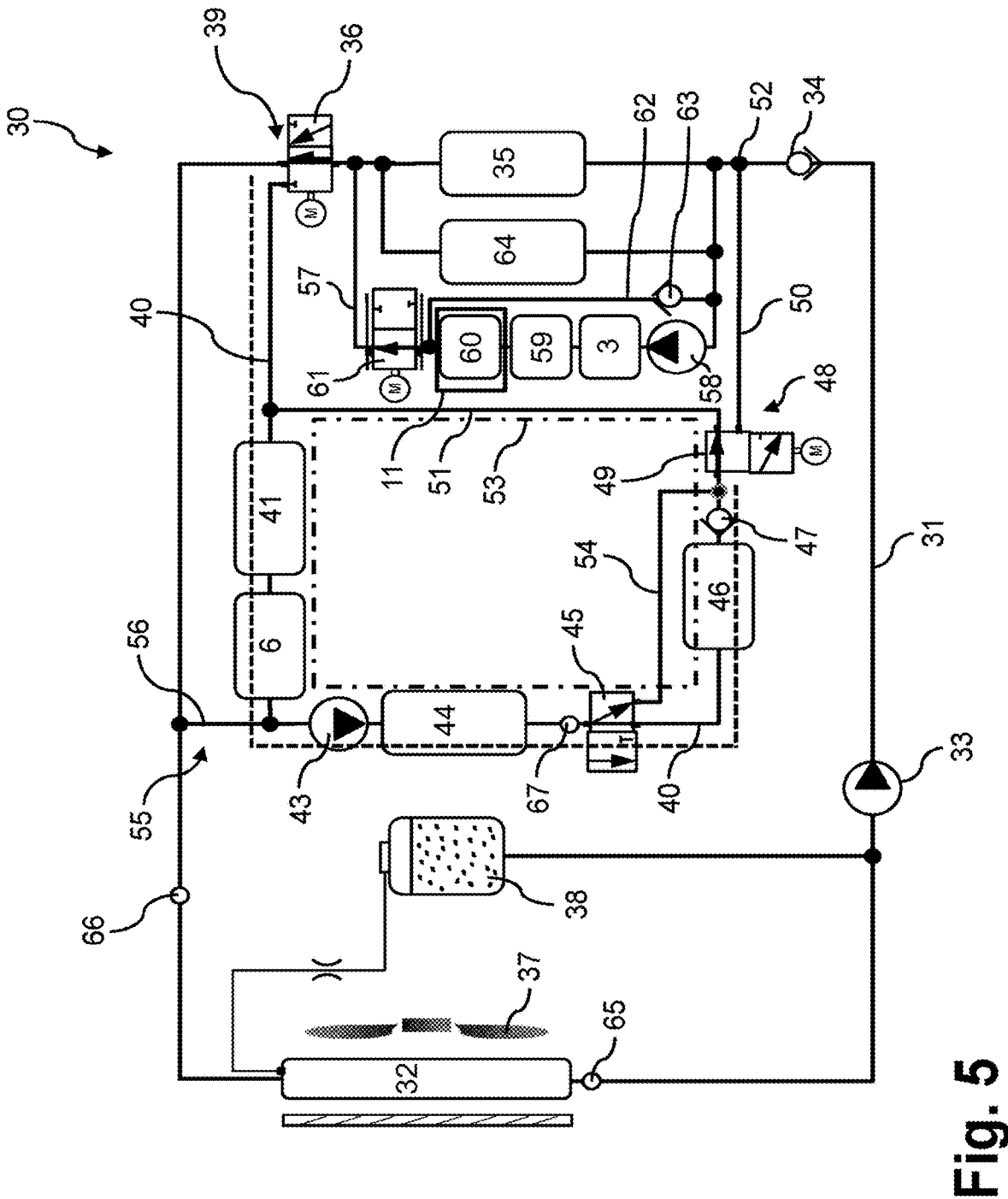
FIG. 5 shows a temperature-control circuit 30 according to a first exemplary embodiment of the invention.

The chiller 6 is a heat exchanger which transfers heat energy between the refrigerant in the refrigerating circuit 1 and the coolant in the temperature-control circuit (FIG. 5 ff.). For this, the refrigerant and the coolant flow through the chiller 6 fluidically separately from one another and so as to exchange heat with one another.

To set the flow through the air-conditioning evaporator 5, to set the expansion of the refrigerant upstream of the air-conditioning evaporator 5 and thus to set its cooling power, the evaporator valve 8 is connected upstream of the air-conditioning evaporator. To set the flow through the chiller 6 and to set the expansion of the refrigerant upstream of the chiller 6, the chiller valve 9 is connected upstream of the chiller. This can involve, for example, self-regulating expansion members that can be electrically shut off or expansion members that are activated by a motor and have a freely selectable opening cross section.

The refrigerating circuit 1 also has the internal heat exchanger 7, which has two chambers through which flow can pass in heating contact but fluidically separately. Here, one chamber is arranged between the condenser 3 and the parallel connection of the air-conditioning evaporator 5 and the chiller 6 and the other chamber is arranged between this parallel connection and the refrigerant compressor 2. Flow preferably passes through the chambers in opposite directions and the chambers thus form a counter-flow heat exchanger. Therefore, the low-pressure gaseous refrigerant flows through the internal heat exchanger 7 in a chamber upstream of the refrigerant compressor 2 and the high-pressure liquid refrigerant coming from the condenser 3 flows through the internal heat exchanger in the other chamber. Through the internal heat exchanger 7, heat energy is extracted from the liquid refrigerant, this having the effect of further cooling the refrigerant. This energy is supplied to the predominantly gaseous refrigerant, this having the effect of evaporating an even higher proportion, which is present in the gaseous state. This serves to increase the power and efficiency of the refrigerating circuit 1. However, the internal heat exchanger 7 is not absolutely necessary for the function of the refrigerating circuit 1.

Furthermore, a pressure-temperature sensor 12 is arranged on an inlet side of the refrigerant compressor 2 and a pressure-temperature sensor 13 is arranged on the outlet side.

Figure 2:
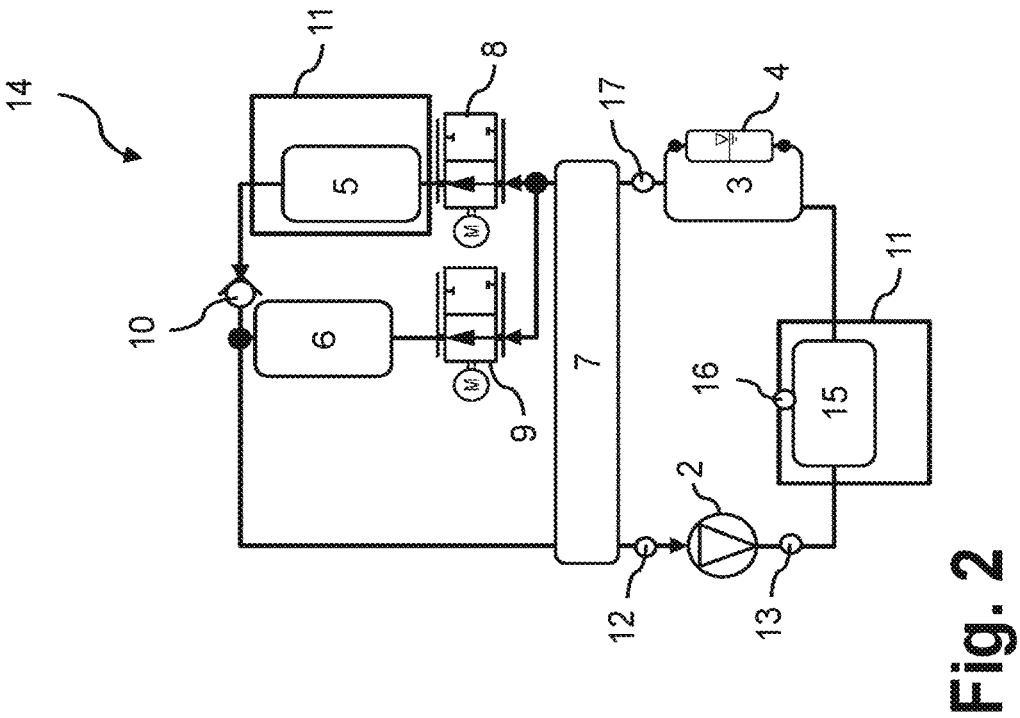
FIG. 2 schematically shows a second embodiment of a refrigerating circuit.

FIG. 2 schematically shows a second embodiment of a refrigerating circuit 14. The refrigerating circuit 14 differs from the refrigerating circuit 1 from FIG. 1 only in that a heating condenser 15, an air-side temperature sensor 16 assigned to the heating condenser 15, and a pressure-temperature sensor 17 arranged downstream of the condenser 3 and upstream of the internal heat exchanger 7 are additionally provided in the refrigerating circuit 14.

Therefore, the refrigerant compressor 2, the heating condenser 15, the condenser 3 and the parallel connection of the air-conditioning evaporator 5 and the chiller 6 are connected in series in the refrigerating circuit 14. In particular, the stated components are connected in series in a closed ring in this order, as seen in the direction of flow of the refrigerant. However, another order is also possible; for example, the order of the heating condenser 15 and the condenser 3 could be swapped around.

The heating condenser 15 is in particular an air-liquid heat exchanger, through which the refrigerant can flow and which is arranged in the air-conditioning unit 11. More specifically, the heating condenser 15 together with the air-conditioning evaporator 5 is arranged in the air guide of the air-conditioning unit 11, via which air can be fed to the vehicle passenger compartment, so that this air can be temperature-controlled, in particular heated, by the heating condenser 15. Usually, the heating condenser 15 can be completely or partially shut off at the air side in the air-conditioning unit 11 via air flaps.

Apart from these differences, reference is made to the description of the refrigerating circuit 1 of FIG. 1, in order to avoid repetitions.

Figure 3:
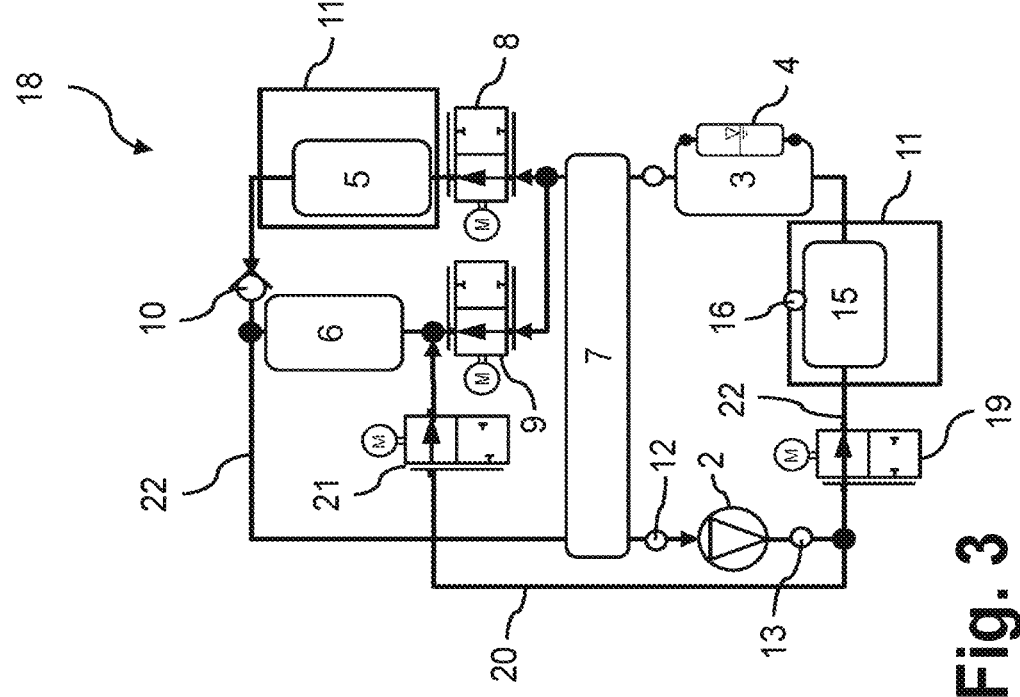
FIG. 3 schematically shows a third embodiment of a refrigerating circuit.

FIG. 3 schematically shows a third embodiment of a refrigerating circuit 18. The refrigerating circuit 18 differs from the refrigerating circuit 14 from FIG. 2 only in that a first valve 19, a return line 20 and a second valve 21 that is provided in the return line are additionally provided. The valves 19 and 21 are adapted to prevent or allow, in particular prevent, partially allow or completely allow a throughflow. They also act as expansion members in the partially open state.

A main circuit 22, in which the refrigerant compressor 2, the first valve 19, the heating condenser 15, the condenser 3 and the parallel connection of the evaporator 5 and the chiller 6 are connected in series, is formed in the refrigerating circuit 18. In particular, the stated components are connected in series in a closed ring in this order, as seen in the direction of flow of the refrigerant.

The return line 20 branches off from the main circuit 22 at a high-pressure side of the refrigerant compressor 2, in particular between the refrigerant compressor 2 and the first valve 19, and goes back into the main circuit 22 upstream of the chiller 6, more specifically between the chiller valve 9 and the chiller 6.

Instead of the two valves 19 and 21, it would be conceivable to provide a single valve, for example a 3/2-way valve with an inlet and two outlets. This would then have to be provided at the point where the return line 20 branches off from the main circuit 22.

In an operating state in which the first valve 19 prevents a throughflow and the second valve 21 allows a throughflow, the return line 20 forms a bypass circuit which comprises only the refrigerant compressor 2, the return line 20 including the second valve 21, the chiller 6 and the internal heat exchanger 7. In this operating state, refrigerant is circulated only in this bypass circuit and, owing to the shut-off of the first valve 19, not in the main circuit 22.

Via this bypass circuit, refrigerant is removed from the high-pressure side in the form of hot gas, is expanded to a low pressure by the second valve 21 and is fed to the low-pressure side of the refrigerant compressor 2. This injection of refrigerant hot gas at the low-pressure side of the refrigerant compressor 2 makes it possible, in particular in a startup phase, to very quickly start the refrigerating circuit 18, because heat energy is fed to the refrigerant via the refrigerant compressor 2 and the refrigerant then circulates back to the inlet of the refrigerant compressor 2 again and has heat energy reapplied to it, without this heat energy being essentially extracted from the refrigerant again.

The refrigerating circuit 18 may also be operated in an operating state in which the first valve 19 is partially or completely open and the second valve 21 prevents a throughflow, so that the main circuit 22 is in operation (refrigerant circulates) and the bypass circuit is not in operation (refrigerant does not circulate). This operating state is suitable, for example, when the refrigerating circuit power requirement (for example for heating the vehicle passenger compartment) is not high enough for the additional heat energy described above to be required by the bypass circuit.

Furthermore, the refrigerating circuit 18 can be operated in an operating state in which the first valve 19 is partially or completely open and the second valve 21 is likewise partially or completely open, so that both the bypass circuit and the main circuit 22 are in operation. This operating state is suitable, for example, after a startup phase, where in continuous operation a high refrigerating circuit power (for example for heating the vehicle passenger compartment) continues to be necessary.

Figure 4:
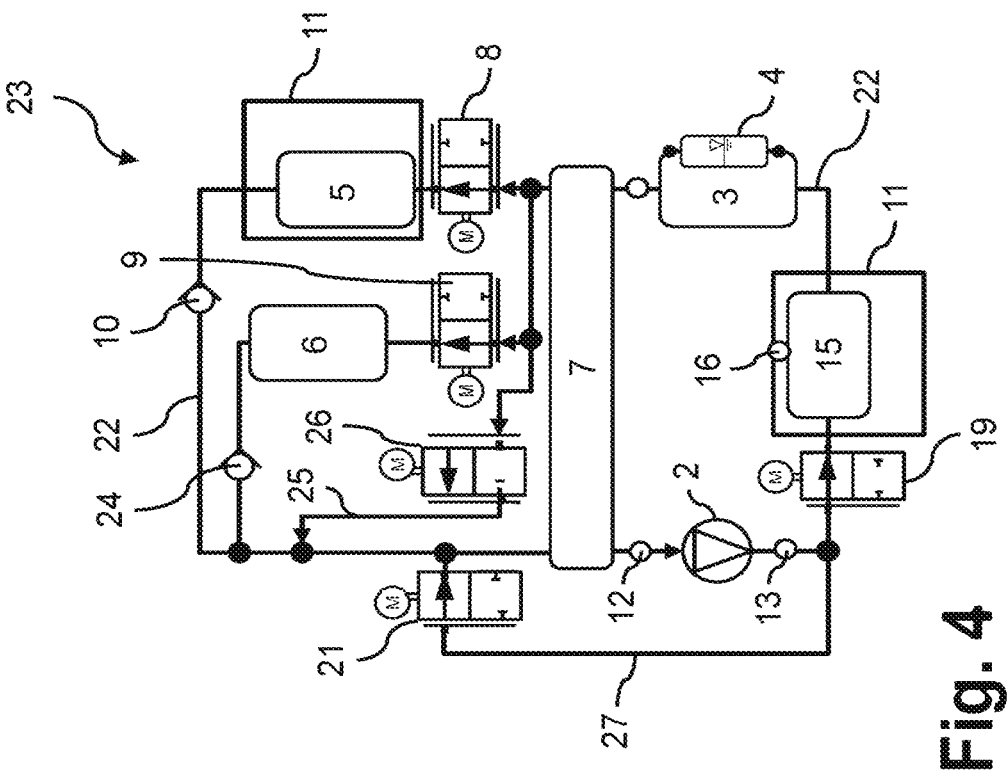
FIG. 4 schematically shows a fourth embodiment of a refrigerating circuit.

FIG. 4 schematically shows a fourth embodiment of a refrigerating circuit 23. The refrigerating circuit 23 differs from the refrigerating circuit 18 of FIG. 3 in that the parallel connection of the air-conditioning evaporator 5 and the chiller 6 has a slightly different structure. A one-way valve 24, or a non-return valve, is provided downstream of the chiller 6. More specifically, the series connection of the evaporator valve 8, the air-conditioning evaporator 5 and the non-return valve 10 is arranged in parallel with respect to a series connection of the chiller valve 9, the chiller 6 and the non-return valve 24. The stated elements are arranged in the respective series connection in the stated order, in particular in the direction of flow.

The refrigerating circuit 23 also differs from the refrigerating circuit 18 in that a bypass line 25, which extends parallel to the parallel connection of the air-conditioning evaporator 5 and the chiller 6, is provided for the parallel connection of the air-conditioning evaporator 5 and the chiller 6. A bypass valve 26 adapted to prevent or allow, in particular to prevent, partially allow or completely allow, a throughflow is arranged in the bypass line 25.

The bypass valve 26 is in particular activated such that it (completely or partially) allows a throughflow while the bypass circuit and the main circuit 22 are in operation. Flow through the air-conditioning evaporator 5 and the chiller 6 is stopped by using the evaporator valve 8 and the chiller valve 9 to prevent throughflow at the high-pressure side and the non-return valves 10 and 24 to prevent throughflow at the low-pressure side. Consequently, the situation is avoided in which a lower pressure prevails at the outlets of the chiller 6 and the air-conditioning evaporator 5 than at their inlets via the non-return valves 10 and 24 during operation of the bypass circuit, which would result in refrigerant being able to be drawn into the chiller 6 and the evaporator 5.

The refrigerating circuit 23 also differs from the refrigerating circuit 18 in that a return line 27, in which the second valve 21 is arranged, branches off from the main circuit 22 at a high-pressure side of the refrigerant compressor 2, in particular between the refrigerant compressor 2 and the first valve 19, and leads back into the main circuit 22 downstream of the chiller 6, more specifically downstream of the non-return valve 10, downstream of the non-return valve 24 and upstream of the internal heat exchanger 7.

Apart from the differences described, the refrigerating circuit 23 corresponds to the refrigerating circuit 18, and therefore reference is made to the description of the latter.

FIG. 5 shows a temperature-control circuit 30 according to a first exemplary embodiment of the present disclosure. This temperature-control circuit 30 comprises a cooler circuit 31, in which a cooler 32, a cooler circuit pump 33, a one-way valve 34, a first heat source 35 and a first valve device 36 are arranged in series. In the switching state of the first valve device 36 illustrated in FIG. 5, the components of the cooler circuit 31 form a closed circuit, in which coolant, which may be for example a water containing additives, can be circulated when the cooler circuit pump 33 is activated.

The cooler 32 is in particular what is referred to as a high-temperature cooler. As is known, it is assigned a fan 37. Furthermore, as is known, a coolant expansion tank 38 is provided.

The one-way valve 34 and/or the delivery direction of the cooler circuit pump 33 predefines a direction of flow of the coolant. A first connection 39, at which a battery line 40 branches off, is arranged downstream of the first heat source 35 and upstream of the cooler 32. The course of the battery line 40 is indicated by a dashed line in FIGS. 5 and 6. In the exemplary embodiment illustrated, the first connection 39 is formed by the first valve device 36, but it should be noted that this does not absolutely have to be the case. For example, the first connection 39 may also simply be a line branch and the first valve device may be in the form of two shut-off valves (one in the battery line 40 and the other one downstream of the first connection 39 in the cooler circuit 31).

A third heat source 41, the chiller 6, a battery pump 43, a fourth heat source 44, a battery bypass valve 45, a traction battery 46 and a one-way valve 47 are arranged in series, in particular arranged in series in the stated order, in the battery line 40. The one-way valve 47 together with the battery bypass valve 45 prevents a follow-on flow of coolant into the traction battery 46 in the event of an internal traction battery leak. The traction battery 46 comprises a multiplicity of electrochemical storage cells which store electrical energy and are made available at least for a drive of the motor vehicle. Furthermore, the storage cells and thus the traction battery 46 are rechargeable.

Also provided is a second connection 48, which in the exemplary embodiment illustrated comprises a second valve device 49 and a connecting line 50. The connecting line 50 leads from the second valve device 49 to the cooler circuit 31 at a point 52 downstream of the cooler circuit pump 33 and upstream of the first heat source 35, in particular downstream of the one-way valve 34 and upstream of the first heat source 35. Also provided is a circulation line 51, which leads from the second valve device 49 back to the battery line 40 at a point between the first connection 39 and the chiller 6, in particular between the first connection 39 and the third heat source 41.

The second valve device 49 has a first switching state, illustrated in FIG. 5, in which a coolant coming from the battery line 40 is conducted into the circulation line 51 and the connecting line 50 is shut off by the second valve device 49, resulting in the formation of a battery cooling circuit 53 (characterized by a dash-dotted line) through which flow can pass in a ring and in which coolant can flow through the components of the battery line 40 in series in the form of a ring-like circuit.

Moreover, the second valve device 49 has a second switching state, in which a coolant coming from the battery line 40 is conducted into the connecting line 50 and the circulation line 51 is shut off by the second valve device 49, so that the coolant coming from the battery line 40 can be guided into the cooler circuit 31.

Intermediate positions are also conceivable, so that coolant flows into the circulation line 51 and the connecting line 50 at the same time.

A battery bypass line 54 branches off from the battery line 40, circumvents the traction battery 46 and the one-way valve 47, in particular exclusively the traction battery 46 and the one-way valve 47, and leads back into the battery line 40, specifically at a point between the one-way valve 47 and the second valve device 49. The battery bypass valve 45 makes it possible for a stream of coolant coming from the cooler circuit pump 33 to be selectively guided into the battery bypass line 54 or through the traction battery 46. Intermediate positions are also conceivable, so that flow passes through the battery bypass line 54 and the traction battery 46 at the same time.

Also provided is a third connection 55, which connects the battery line 40 at a point between the chiller 6 and the battery pump 43 to the cooler circuit 31 at a point downstream of the first connection 39 and upstream of the cooler 32. In the exemplary embodiment illustrated, the third connection comprises a connecting line 56 without a valve, but it would also be possible to provide a valve.

A condenser line 57 is provided between the second connection 48 and the first connection 39. In particular, the condenser line 57 is arranged downstream of the second connection 48 and upstream of the first connection 39. The condenser line 57 is connected in parallel with respect to the first heat source 35 in the exemplary embodiment illustrated. An embodiment in which the condenser line 57 is connected in series with respect to the first heat source 35 would, however, also be conceivable, and this would also require the refrigerant circuit to be adapted. In the exemplary embodiment illustrated, the condenser line 57 branches off from the cooler circuit 31 downstream of the point 52. A condenser line pump 58, the condenser 3 (already described in connection with FIGS. 1 to 4), an electric heater 59, a heating heat exchanger 60 and a condenser line valve 61 are arranged in series, in particular in the stated order in the direction from the second connection 48 to the first connection 39, in the condenser line 57. The electric heater 59 is an electric auxiliary heater, which can be operated electrically and selectively heats a coolant flowing through the condenser line 57. The heating heat exchanger 60 is a heat exchanger through which air can flow and which is arranged in the air-conditioning unit 11, in particular in the air guide of the air-conditioning unit 11, in order thus to heat air that is to be fed to a vehicle passenger compartment. The condenser line valve 61 is a proportional valve, which makes it possible to control a flow through the condenser line 57. A return line 62, which leads to the inlet side of the condenser line pump 58, branches off between the heating heat exchanger 60 and the condenser line valve 61. A one-way valve 63, which only allows a flow in the direction toward the inlet side of the condenser line pump 58, is provided in the return line 62.

Moreover, a second heat source 64 is connected in parallel with respect to the first heat source 35 and in parallel with respect to the condenser line 57.

The first heat source 35 and the second heat source 64 are, for example, electric drive machines, electric heaters, controllers, power electronics, or DC-DC converters. They may be operated at an efficient operating point or at an inefficient operating point to generate heating power.

The third heat source 41 and the fourth heat source 44 are, for example, electric heaters, controllers, power electronics, or DC-DC converters. They may likewise be operated at an efficient operating point or at an inefficient operating point to generate heating power.

A temperature sensor 65 is also provided at the downstream outlet of the cooler 32. Another temperature sensor 66 is provided upstream of the cooler 32, more specifically in the cooler circuit 31 between the third connection 55 and the cooler 32. A temperature sensor 67 is also provided between the fourth heat source 44 and the battery bypass valve 45.

The temperature-control circuit 30 from FIG. 5 interacts, for example, with the refrigerating circuit 1 from FIG. 1. For example, in the refrigerating circuit 1 heat energy is taken up via the evaporator 5 and/or the chiller 6 and discharged into the condenser line 57 via the condenser 3. There, the heating heat exchanger 60 transfers heat energy into the air stream of the air-conditioning unit 11, which controls the temperature of the vehicle passenger compartment.

Various specific operating modes of the temperature-control circuit 30 will be explained later on.

Figure 6:
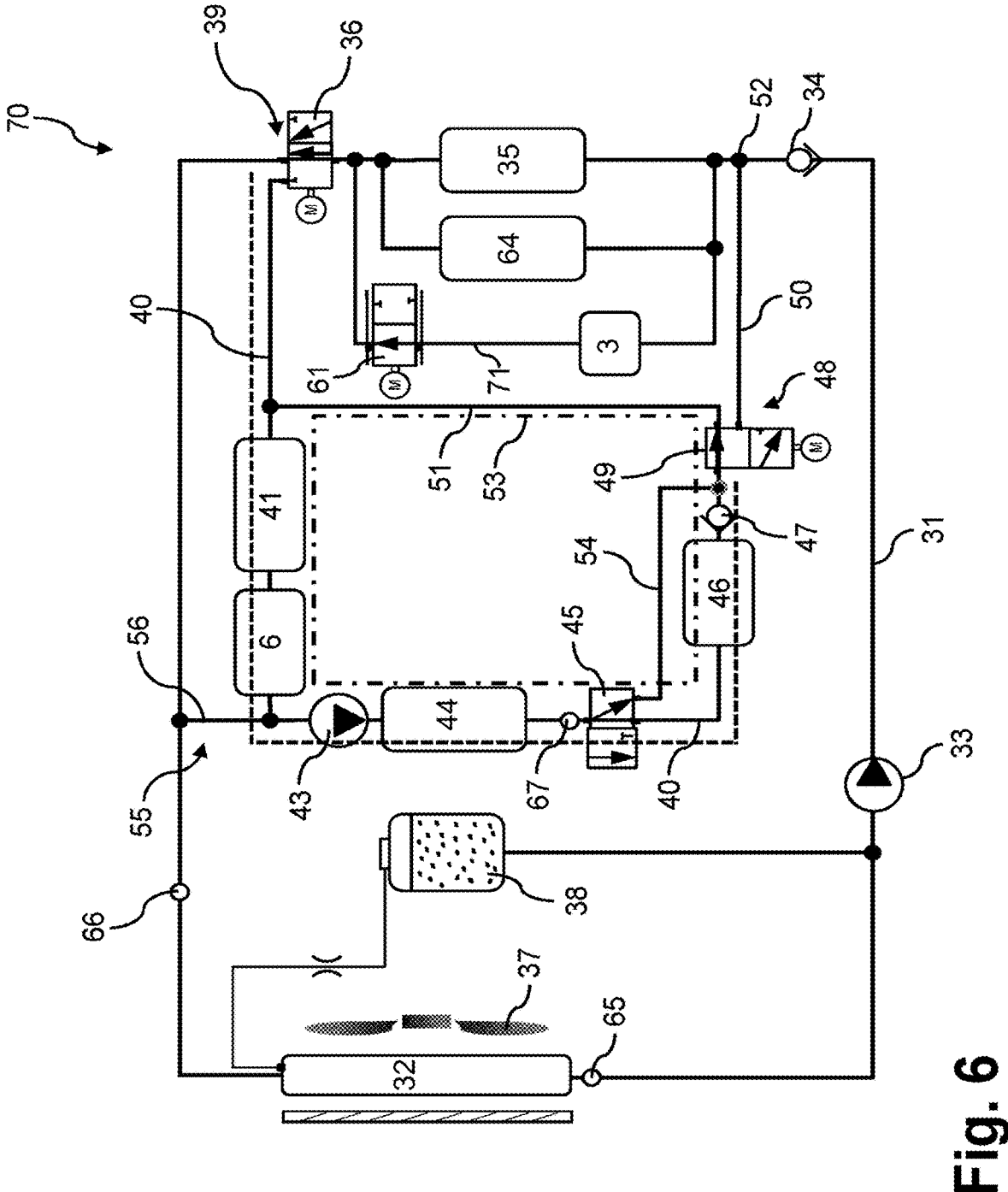
FIG. 6 shows a temperature-control circuit 70 according to a second exemplary embodiment of the invention.

FIG. 6 shows a temperature-control circuit 70 according to a second exemplary embodiment of the present disclosure. This temperature-control circuit 70 differs from the temperature-control circuit 30 from FIG. 5 only by virtue of a modified condenser line 71 and the lack of a return line 62. In comparison with the condenser line 57, the condenser line pump 58, the electric heater 59 and the heating heat exchanger 60 are missing from the condenser line 71. In other words, the condenser 3 and the condenser line valve 61 are in series in the condenser line 71.

Apart from these stated differences, the temperature-control circuit 70 corresponds to the temperature-control circuit 30, and therefore reference is made to the description of the latter in order to avoid repetitions.

The heating heat exchanger 60, which is not present in the temperature-control circuit 70, is replaced by the use of the refrigerant-side heating condenser 15 (see FIGS. 2 to 4) for heating the vehicle passenger compartment. That is, the temperature-control circuit 70 interacts in particular with the refrigerating circuits of the second to fourth embodiments, which were described in FIGS. 2 to 4. The condenser line valve 61 enables regulated discharge of heat from the condenser 15 into the temperature-control circuit 70, so that sufficient heating power is available for the vehicle passenger compartment.

FIGS. 7 to 12 illustrate various operating states of the temperature-control circuit 70 according to the second exemplary embodiment, and these operating states will be described below. However, this description applies, mutatis mutandis, to the temperature-control circuit 30 according to the first exemplary embodiment, with which the same operating states can be produced. In FIGS. 7 to 12 and also FIGS. 14, 16, 17 and 21, coolant flows through each of the coolant lines illustrated as solid lines, that is, coolant moves with respect to the lines. By contrast, flow does not pass through the coolant lines illustrated with dashed lines, or the coolant does not move with respect to the lines in these lines. Furthermore, the valves are always depicted in the same switching position irrespective of the operating state, but those skilled in the art of course will use the depicted and/or described course of flow in the temperature-control circuit to identify to what switching position of the valve it corresponds.

Figure 7:
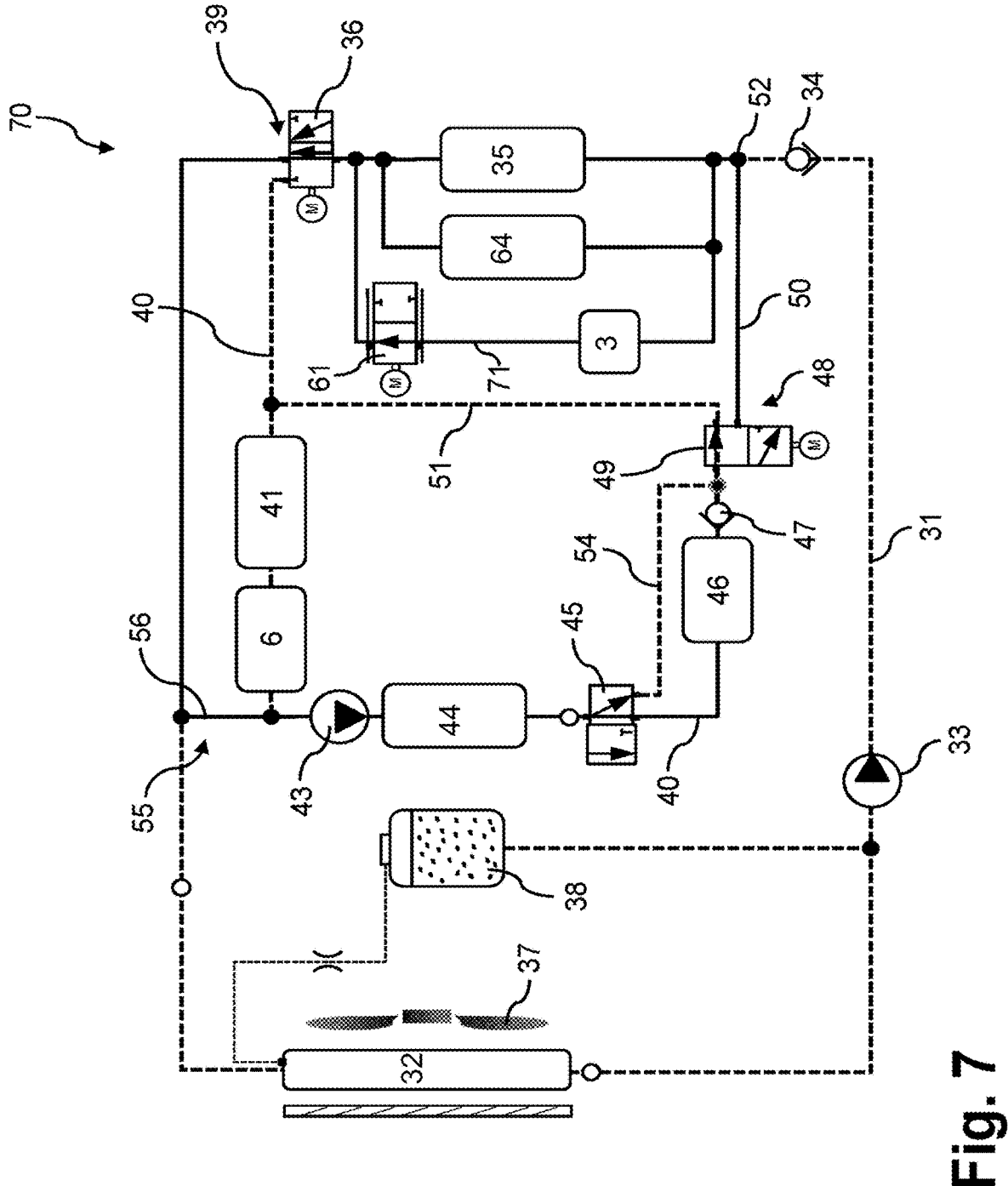
FIG. 7 shows a first operating state of the temperature-control circuit 70 according to the second exemplary embodiment.

FIG. 7 illustrates a first operating state of the temperature-control circuit 70 according to the second exemplary embodiment. In this operating state, the cooler circuit pump 33 is not active, and a backflow via the cooler 32 is stopped by the one-way valve 34. The first valve device 36, the second valve device 49 and the battery bypass valve 45 are connected in such a way that flow passes through the first and the second heat source 35 and 64 and the condenser 3 in parallel with respect to one another. Flow passes through this parallel connection in turn in series with respect to the fourth heat source 44 and the traction battery 46. This makes it possible to heat the traction battery 46 by waste heat from the first heat source 35, the second heat source 64, the fourth heat source 44 and the condenser 3. The volumetric flow of coolant through the condenser 3 is set by the condenser line valve 61, so that here heat is discharged into the condenser line 71 in a defined way. This is necessary in particular when the vehicle passenger compartment is simultaneously heated by the heating condenser 15, that is, heat is discharged from the refrigerating circuit by the heating condenser 15 and at the same time by the condenser 3. It is necessary to regulate the volumetric flow by the condenser line valve 61 in order not to remove too much heat from the refrigerating circuit, as this would cause the heating power in the vehicle passenger compartment and the pressure and temperature in the refrigerating circuit to drop and it would thus be difficult to comfortably control the temperature in the vehicle passenger compartment.

The chiller 6 and the third heat source 41 are circumvented, and flow does not pass through them, in this first operating state. This can be expedient for two reasons.

Firstly, hydraulic pressure losses through the chiller 6 and the third heat source 41 are avoided, which can lead to better efficiency, an increased volumetric flow or smaller dimensions of the battery pump 43. Secondly, in the case of refrigerating circuit configurations with a compressor bypass, such as in FIG. 3, having cold coolant (approx. <15° C.) flow through the chiller 6 would not be advisable, since this would cause too much heat to be removed from the refrigerating circuit as the chiller 6 cannot be shut off at the refrigerant side. Consequently, not enough heating power would be available, in particular for the vehicle passenger compartment. The fourth embodiment of the refrigerating circuit (FIG. 4) does not have this restriction, since the chiller 6 can be circumvented at the refrigerant side in a bypass operating mode by the bypass valve 26, which acts as an expansion member. Heat sources which require a continuous throughflow of coolant and the lower temperature, for example many electronics components, can therefore only be positioned at the location of the fourth heat source 44 or directly upstream of the second valve device 49 in this operating state.

Figure 8:
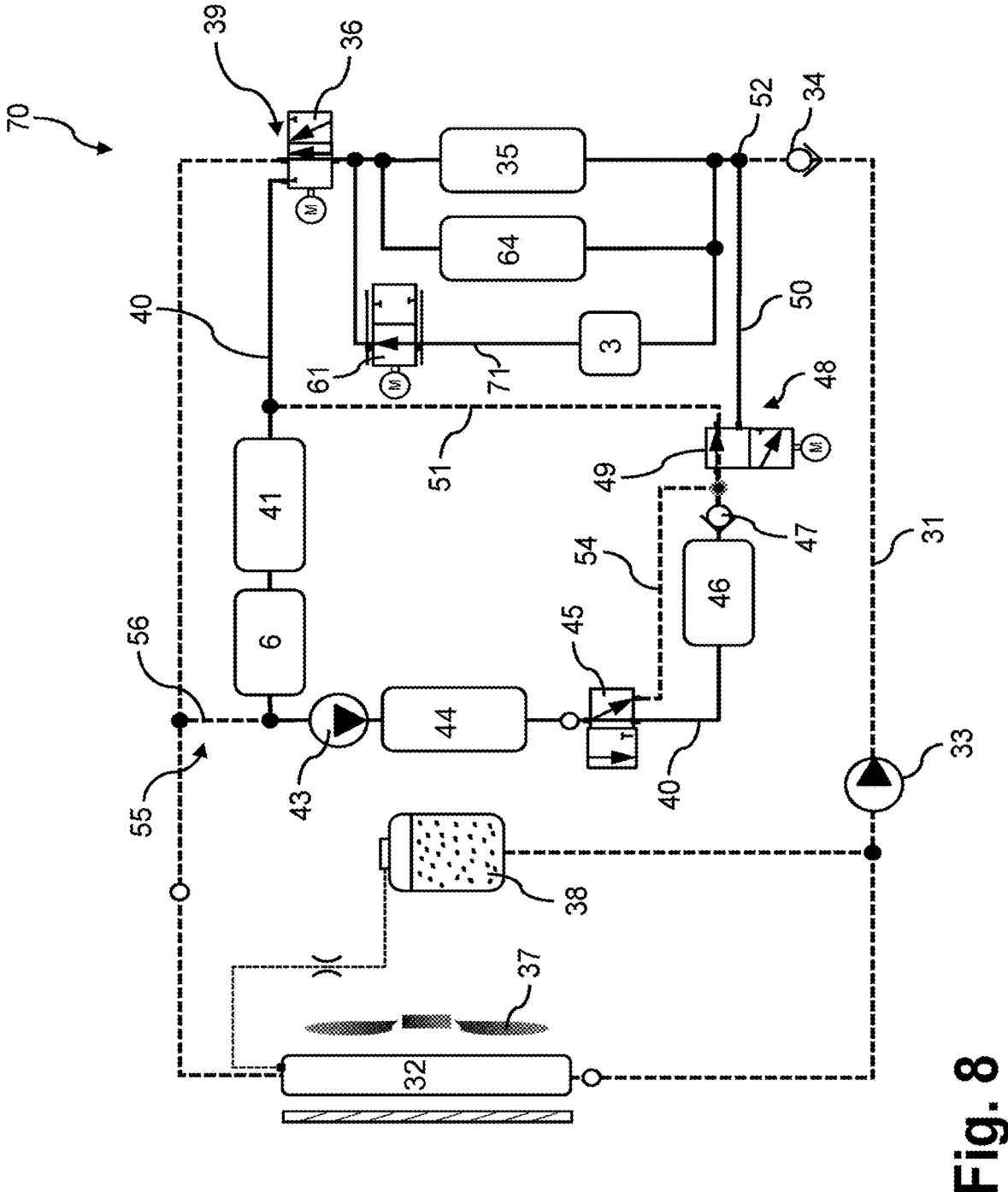
FIG. 8 shows a second operating state of the temperature-control circuit 70 according to the second exemplary embodiment.

FIG. 8 illustrates a second operating state of the temperature-control circuit 70 according to the second exemplary embodiment. In this operating state, the first valve device 36 is connected in such a way that, by contrast to the first operating state from FIG. 7, flow additionally passes through the chiller 6 and the third heat source 41, that is, they are also connected in series. This is expedient in particular in combination with the refrigerating circuits of FIGS. 1, 2 and 4. This second operating state is also conceivable in combination with the refrigerating circuit 23 of FIG. 3 from a coolant temperature of approx. >15° C., since in this case heat would be transferred from the temperature-control circuit 70 to the refrigerating circuit 23. As soon as the temperature in the temperature-control circuit 70 is higher than the temperature (pressure at the pressure-temperature sensor 12), corresponding to the intake pressure, in the refrigerating circuit 23, it is possible to use the chiller 6 to apply an additional load in the refrigerating circuit 23 as a measure for increasing the heating power. This causes the power intake of the refrigerant compressor 2 to rise, resulting in an increased heating power. This can be utilized either for the vehicle passenger compartment or the traction battery 46.

Additionally possible in the same switching state is an operating state in which the drivetrain, in particular the drive motors, is or are preheated to the optimum temperature in terms of efficiency (approx. 50° C.) by circumventing the cooler 32. This is advantageous if a heat pump operating mode is not activated and an outside temperature is, for example, above 20° C.

Figure 9:
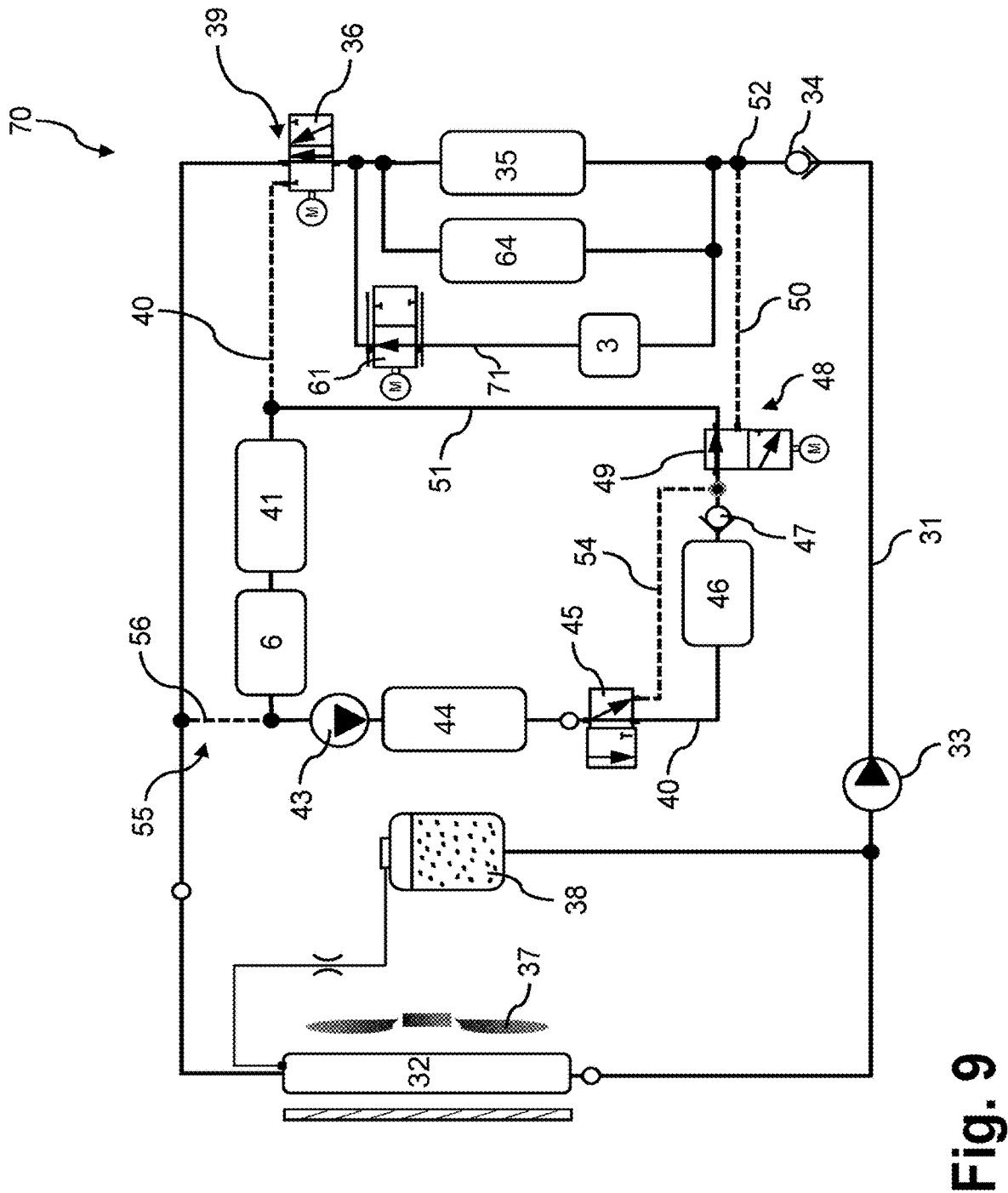
FIG. 9 shows a third operating state of the temperature-control circuit 70 according to the second exemplary embodiment.

FIG. 9 illustrates a third operating state of the temperature-control circuit 70 according to the second exemplary embodiment. In this operating state, the closed-ring battery cooling circuit 53 (see FIGS. 5 and 6) and the closed-ring cooler circuit 31 are formed, in both of which coolant circulates at the same time without an essential exchange of coolant taking place between these two circuits. This third operating state is a cooling operating mode, in which the first to fourth heat sources 35, 64, 41, 44 are operated at an efficient operating point. Heat is discharged to the surrounding area via the cooler 32. The waste heat from the third and the fourth heat source 41, 44 and the traction battery 46 is discharged across to the refrigerating circuit by the chiller 6.

In a particularly efficient operating mode, it is conceivable to buffer the waste heat from the third heat source 41 and the fourth heat source 44 in the thermal mass of the traction battery 46. This has the advantage that only the battery pump 43, but not the chiller 6, needs to be operated. The waste heat can be utilized in the event of relatively cold temperatures to heat the traction battery 46 or for a downstream heat pump application for efficient heating of the vehicle passenger compartment.

Figure 10:
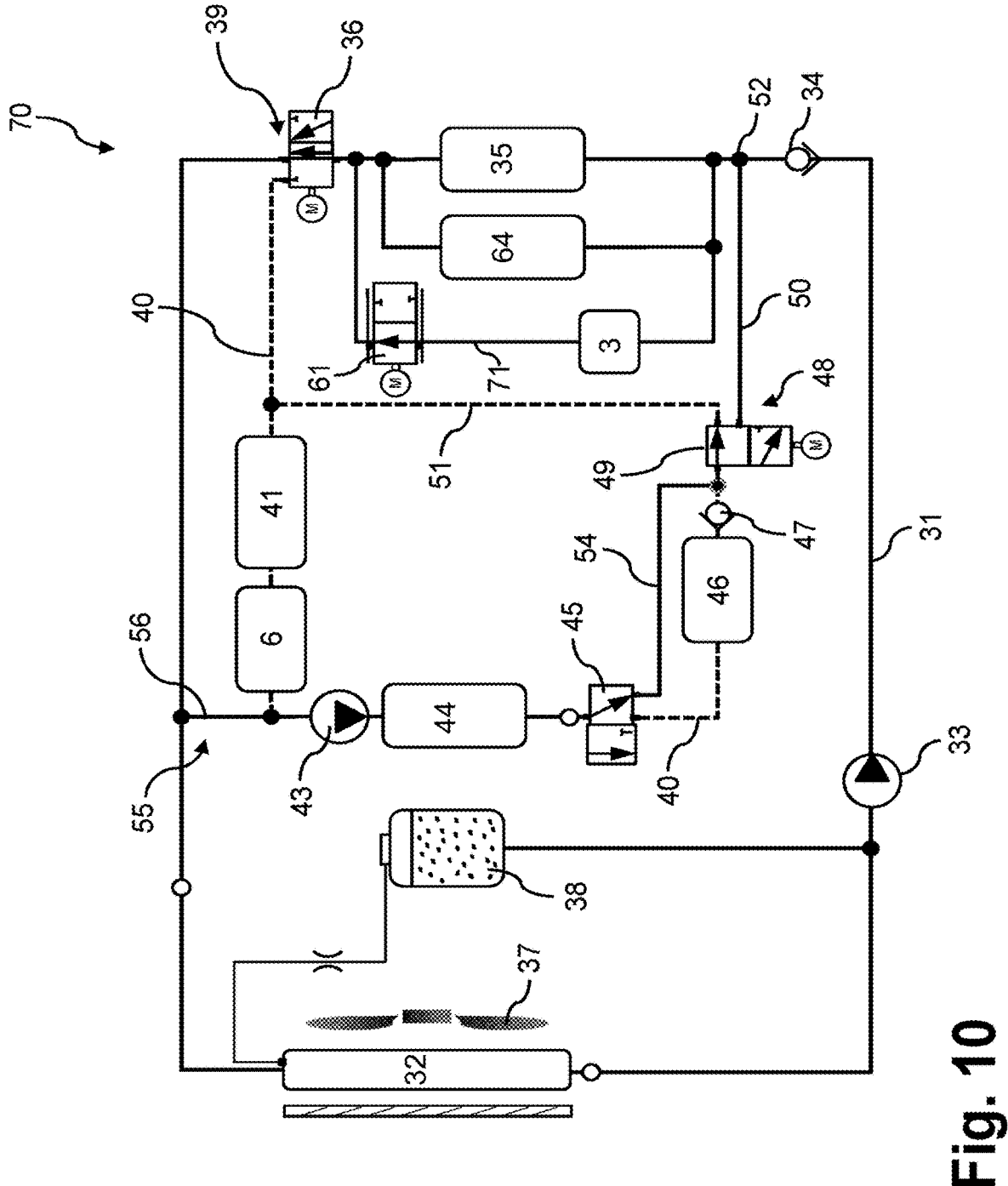
FIG. 10 shows a fourth operating state of the temperature-control circuit 70 according to the second exemplary embodiment.

FIG. 10 illustrates a fourth operating state of the temperature-control circuit 70 according to the second exemplary embodiment. In this fourth operating state, the first valve device 36, the second valve device 49 and the battery bypass valve 45 are connected in such a way that the fourth heat source 44 is connected in parallel with respect to the first and the second heat source 35, 64 and the condenser 3. Here, the traction battery 46 is circumvented via the battery bypass line 54 and flow passes backward through the fourth heat source 44 and the battery pump 43 (not active). In other words, flow passes through the cooler circuit 31 in a ring, and a parallel line branches off at the point 52, the parallel line extending along the connecting line 50, the battery bypass line 54, the fourth heat source 44 and the connecting line 56 to lead back into the cooler circuit 31 at the third connection 55. This results in the advantage of particularly energy-efficient cooling of the fourth heat source 44, since the battery pump 43 and the chiller 6 do not need to be operated.

Optionally, flow through the traction battery 46 is also conceivable by switching over the battery bypass valve 45, although for this the one-way valve 47 would have to be omitted.

Figure 11:
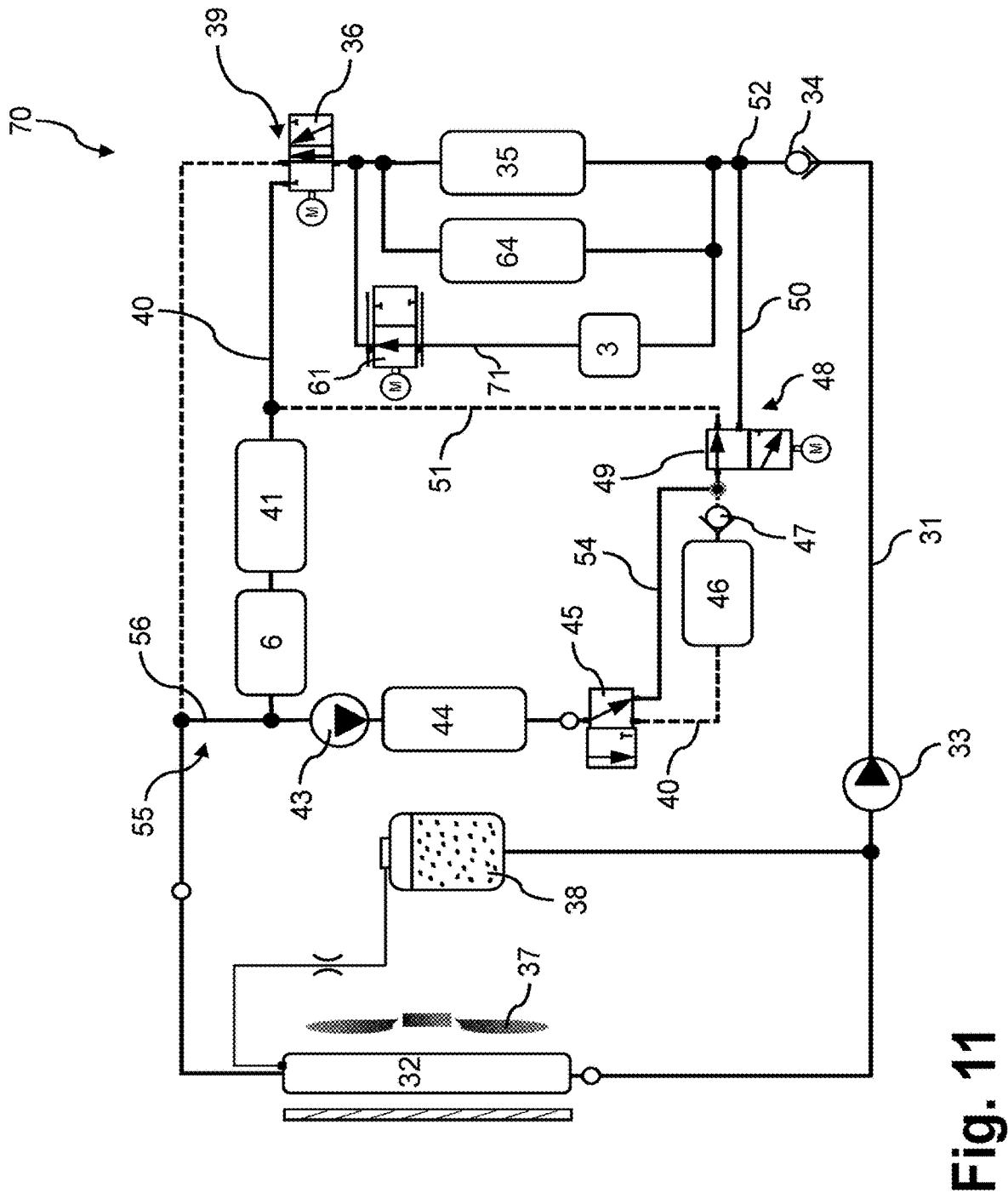
FIG. 11 shows a fifth operating state of the temperature-control circuit 70 according to the second exemplary embodiment.

FIG. 11 illustrates a fifth operating state of the temperature-control circuit 70 according to the second exemplary embodiment. In this fifth operating state, by contrast to the fourth operating state from FIG. 10, the first valve device 36 is in its other switching position and has been switched such that the third heat source 41 and the chiller 6 are connected in series with respect to the parallel connection of the first heat source 35, the second heat source 64 and the condenser line 57. This connection is in turn connected in parallel with respect to the fourth heat source 44, through which flow passes backward. This operating state is expedient in particular for efficient cooling of the third and the fourth heat source 41, 44. In other words, in this operating state a ring-like circuit is formed from the series connection of the cooler 32, the cooler circuit pump 33, the parallel connection (first heat source 35, second heat source 64 and condenser 3), the third heat source 41, the chiller 6 and the third connection 55. For this, a parallel line is formed that branches off at the point 52, has a series connection of the connecting line 50, the battery bypass line 54 and the fourth heat source 44 and leads back into the circuit described above at the third connection 55.

Figure 12:
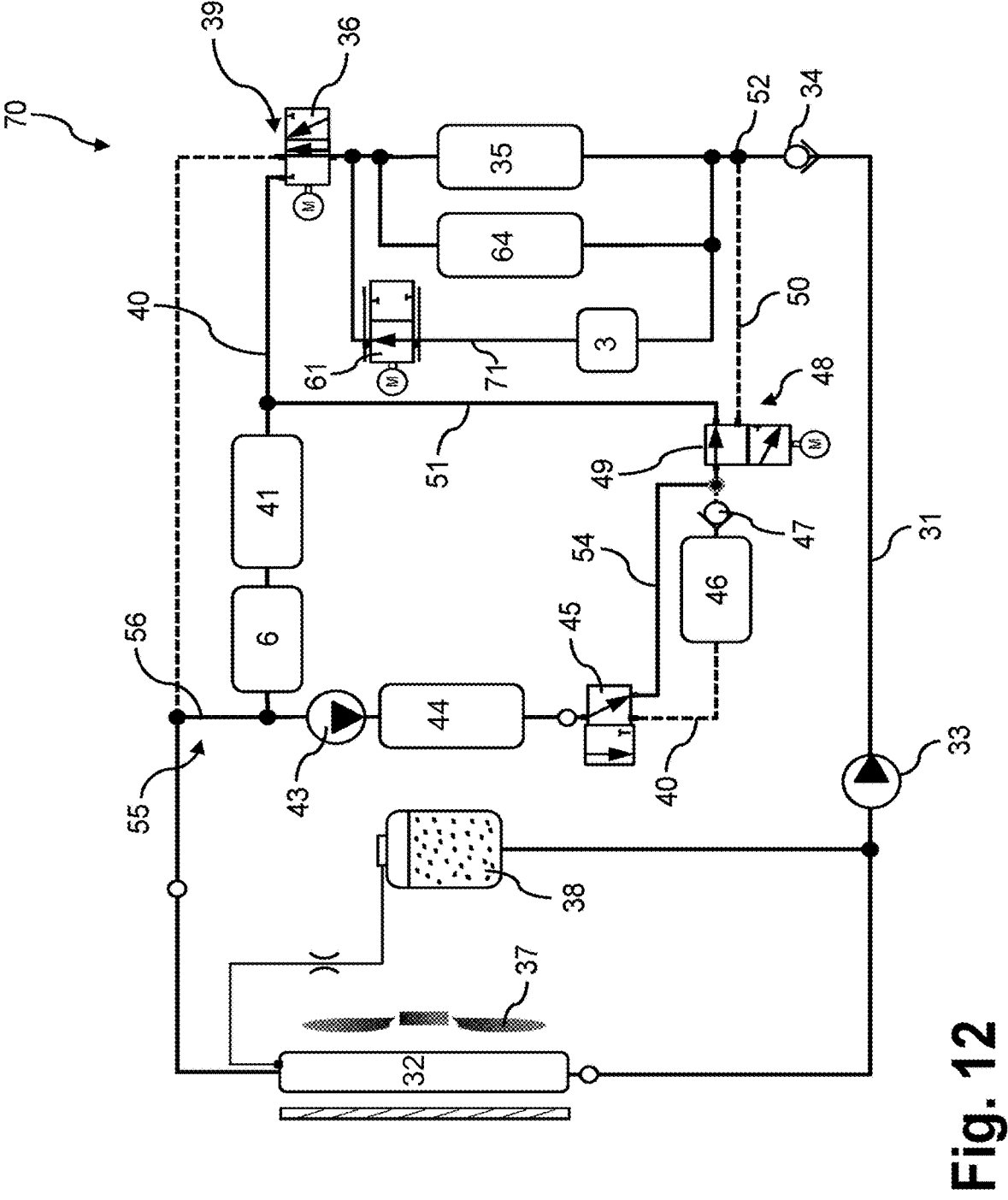
FIG. 12 shows a sixth operating state of the temperature-control circuit 70 according to the second exemplary embodiment.

FIG. 12 illustrates a sixth operating state of the temperature-control circuit 70 according to the second embodiment. In this operating state, the second valve device 49 is connected such that flow does not pass through the connecting line 50, and the battery cooling circuit 53 (see FIGS. 5 and 6) is formed with circumvention of the traction battery 46. At the same time, a ring-like circuit is formed from a series connection of the cooler 32, the cooler circuit pump 33, the parallel connection (first heat source 35, second heat source 64 and condenser 3), the third heat source 41, the chiller 6 and the third connection 55. When the battery pump 43 is active, flow passes through the fourth heat source 44 counterclockwise, so that the streams of coolant mix at the opening of the circulation line 51 upstream of the third heat source 41, these coolant flows coming for the one part from the fourth heat source 44 and for the other part from the first heat source 35, the second heat source 64 and the condenser 3. This operating mode is expedient in particular in the heat pump operating mode, since that makes it possible to use the chiller 6 to utilize the waste heat from the fourth heat source 44 for heating the vehicle passenger compartment.

If the battery pump 43 is not active, flow passes backward through it passively, as a result of which flow passes through the fourth heat source 44 in parallel with respect to the chiller 6 and the third heat source 41. This operating state is advantageous in particular in terms of pump power, since the battery pump 43 does not need to be operated. By contrast to the fourth and fifth operating states, this results in the advantage that the fourth heat source 44 is arranged in series and not in parallel with respect to the first and the second heat source and the condenser 3 and therefore does not reduce the volumetric flow through them.

Figure 13:
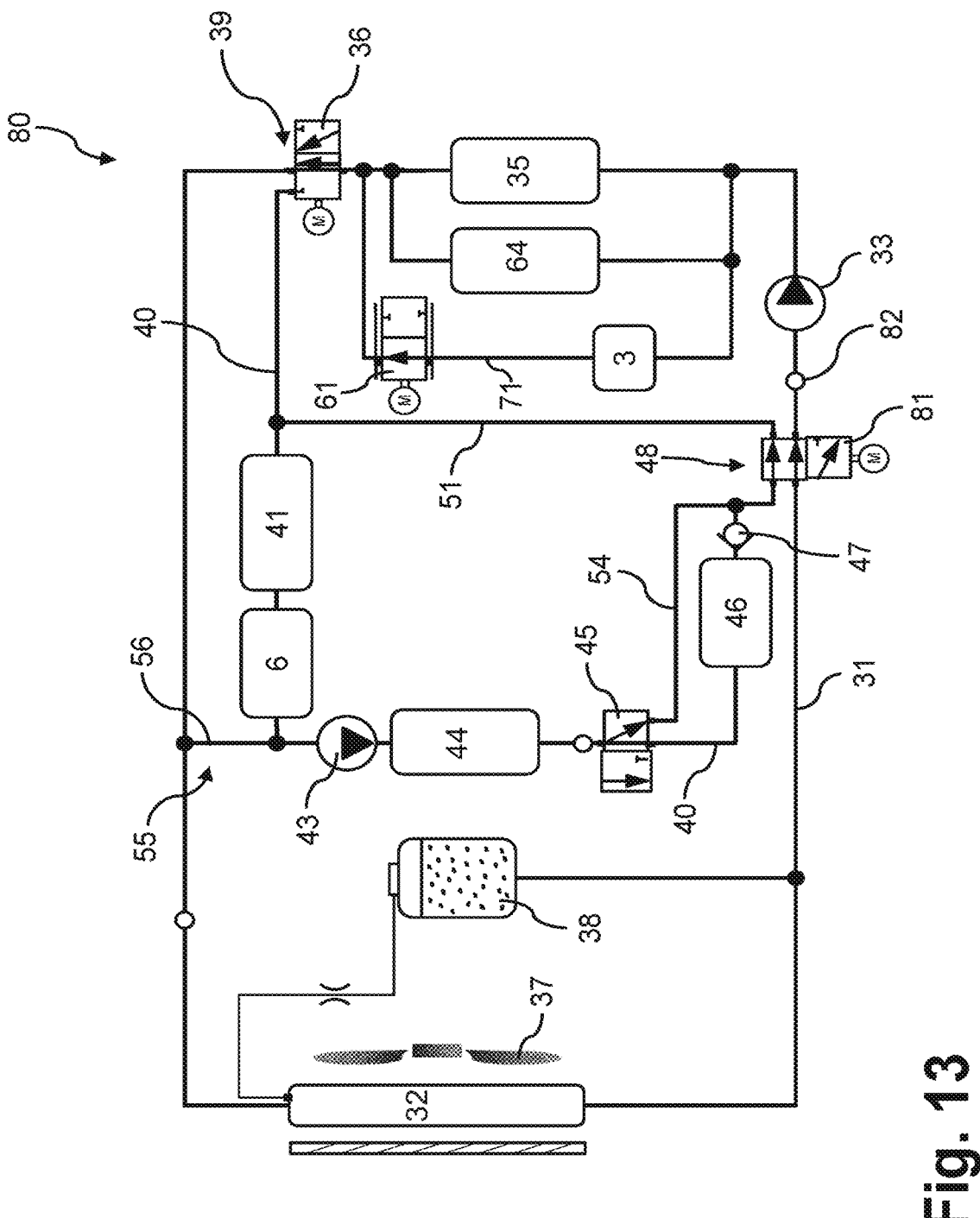
FIG. 13 shows a temperature-control circuit 80 according to a third exemplary embodiment of the invention.

FIG. 13 shows a temperature-control circuit 80 according to a third exemplary embodiment of the present disclosure. This temperature-control circuit 80 differs from the temperature-control circuit 70 only in that the second connection 48 only has a second valve device 81 and does not have a connecting line 50. The placement of the second valve device 81 in the battery cooling circuit 53 corresponds to that of the second valve device 49. For example, the second valve device 81 is in the form of a 2/2-way valve. The second valve device 81 has two switching positions, the stream of coolant coming from the battery bypass line 54 or the traction battery 46 being conducted into the circulation line 51 in a first switching position. At the same time, in this switching position, the coolant coming from the cooler 32 is conducted to the parallel connection of the condenser line 71, the first heat source 35 and the second heat source 64 by the second valve device 81. In functional terms, the second connection 48 according to FIG. 13 corresponds to the second connection 48 according to FIGS. 5 and 6, except that in FIGS. 5 and 6 the connection is established by the second valve device 49 plus the connecting line 50 and in FIG. 13 the connection is established only by the second valve device 81.

Moreover, by contrast to the temperature-control circuit 70, the cooler circuit pump 33 in the cooler circuit 31 is downstream of the second connection 48, or downstream of the second valve device 81.

In a second switching position, the circulation line 51 is shut off at the second valve device 81 and the line coming from the cooler 32 is likewise shut off at the second valve device 81. The stream of coolant coming from the battery bypass line 54 or the traction battery 46 is guided to the cooler circuit pump 33 and to the parallel connection of the first heat source 35, the second heat source 64 and the condenser 3. This has the effect that, in the second switching position, for example the parallel connection (first and second heat source 35, 64 and condenser 3), the fourth heat source 44 and selectively the traction battery 46 and/or the battery bypass line 54 are connected in series in a closed ring. Depending on the switching position of the first valve device 36, selectively with or without the series connection of the third heat source 41 and the chiller 6 between the parallel connection and the fourth heat source 44.

This third exemplary embodiment therefore makes it possible to produce a series connection of the cooler circuit pump 33 and the battery pump 43 in the first and the second operating state described above. In these operating states, both the cooler circuit pump 33 and the battery pump 43 are activated, which can lead to smaller dimensions of the battery pump 43. The one-way valve 34 can be omitted. Also provided is a temperature sensor 82, which is arranged between the second valve device 81 and the cooler circuit pump 33, since as a result the return temperature of the traction battery 46 or the cooler 32 can be measured.

Figure 14:
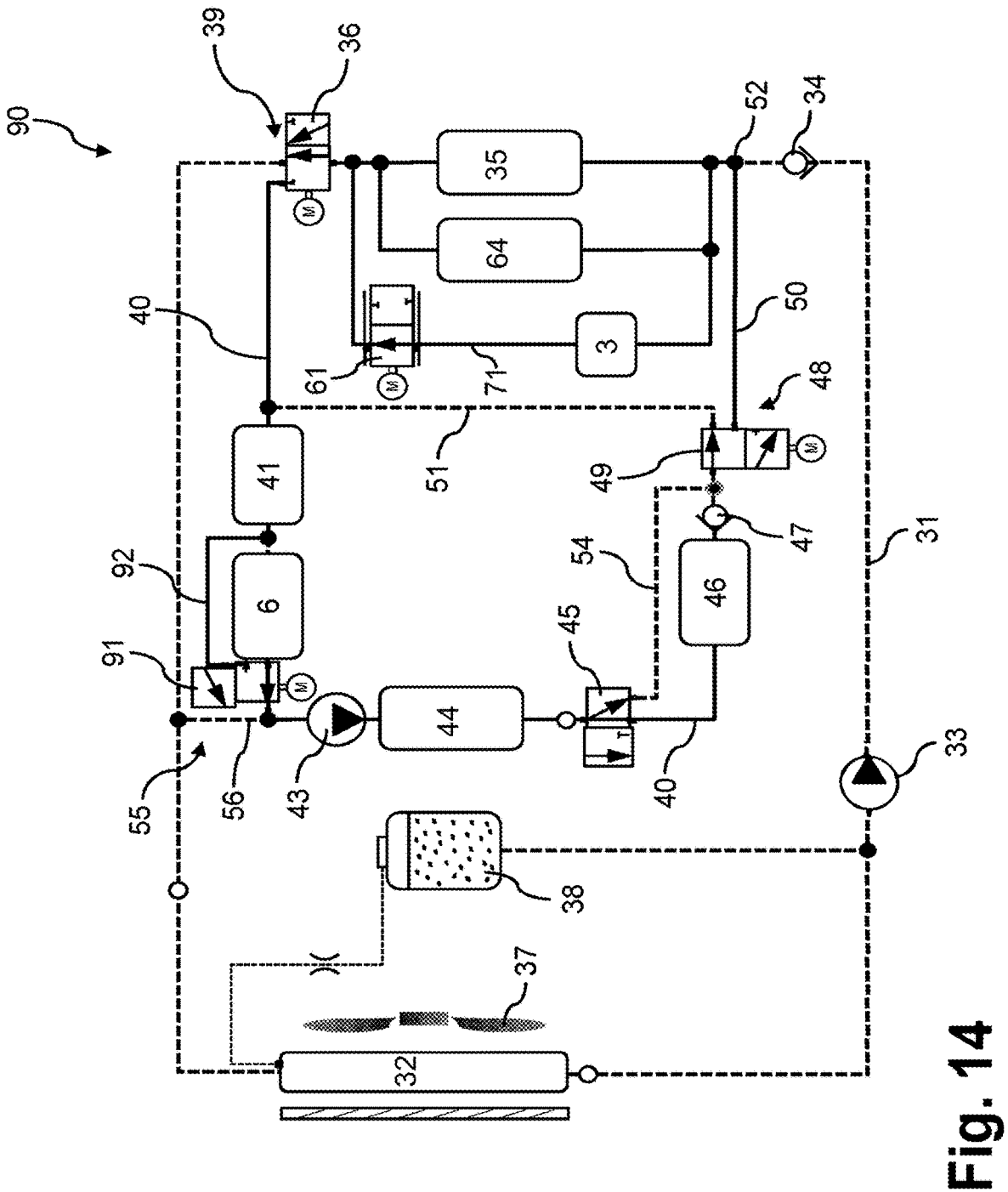
FIG. 14 shows a temperature-control circuit 90 according to a fourth exemplary embodiment of the invention.

FIG. 14 shows a temperature-control circuit 90 according to a fourth exemplary embodiment of the present disclosure. In comparison with the temperature-control circuit 70, this exemplary embodiment additionally has a chiller bypass valve 91 and a chiller bypass line 92.

The chiller bypass line 92 branches off from the battery line 40, circumvents (only) the chiller 6 and leads back into the battery line 40 again. This chiller bypass valve 91 makes it possible to guide a stream of coolant coming from the third heat source 41 selectively through the chiller bypass line 92 or through the chiller 6. Intermediate positions are also conceivable, so that flow passes through the chiller bypass line 92 and the chiller 6 at the same time.

As already mentioned, in FIG. 14 coolant flows through each of the coolant lines illustrated as solid lines and flow does not pass through the coolant lines illustrated with dashed lines.

With this exemplary embodiment, it is possible for flow to pass through the third heat source 41 and then through the chiller bypass line 92 in the first operating state.

Figure 15:
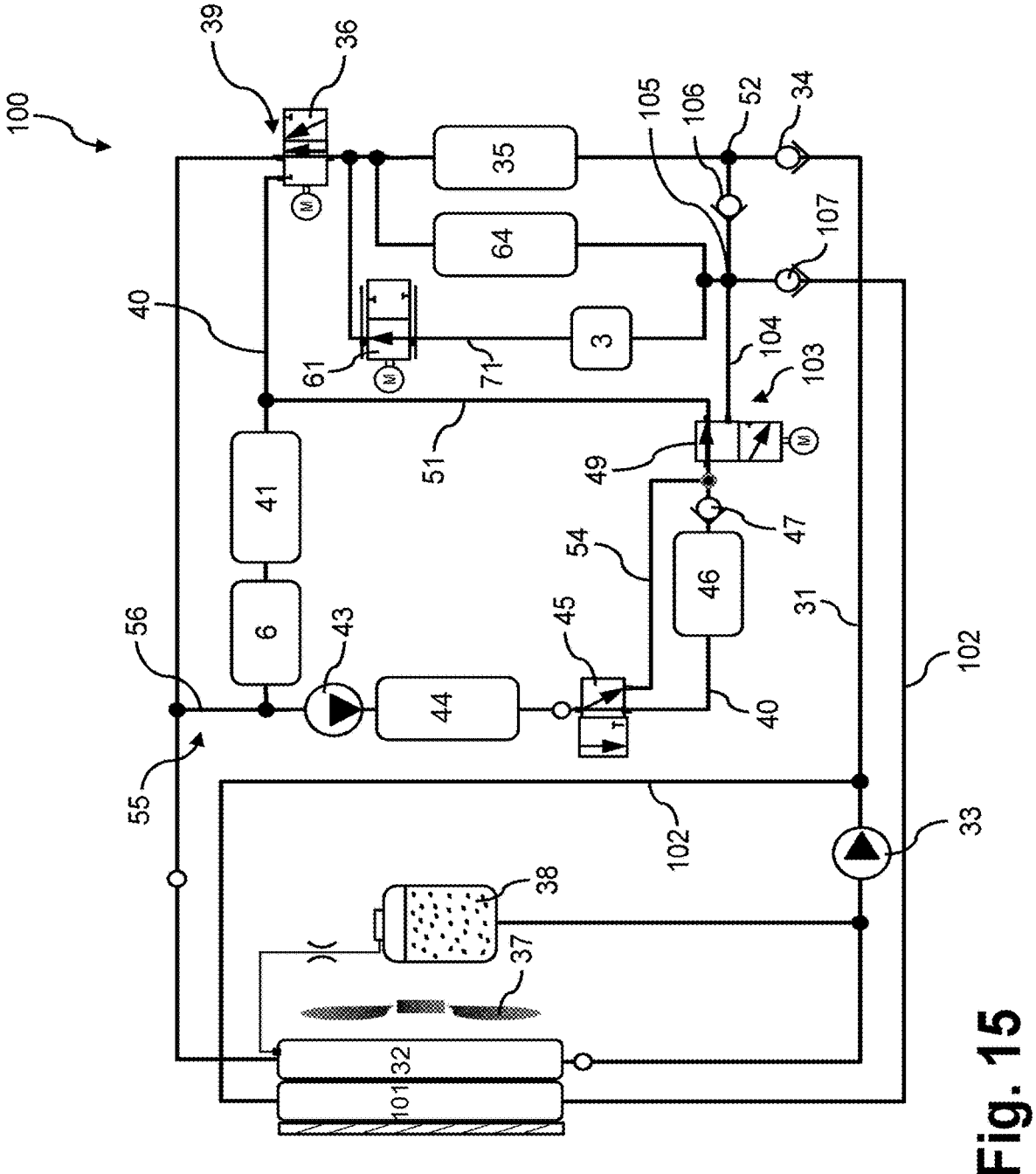
FIG. 15 shows a temperature-control circuit 100 according to a fifth exemplary embodiment of the invention.

FIG. 15 shows a temperature-control circuit 100 according to a fifth exemplary embodiment of the present disclosure. In comparison with the temperature-control circuit 70, this exemplary embodiment additionally has a LT cooler (what is referred to as a low-temperature cooler). It is arranged in a LT cooler line 102, which branches off from the cooler circuit 31 downstream of the cooler circuit pump 33, in particular between the cooler circuit pump 33 and the one-way valve 34, and leads into a first connection 103, more specifically a connecting line 104. The connecting line 104 differs from the connecting line 50 only in that the LT cooler line 102 leads into it at a junction 105, the condenser line 71 branches off from the LT cooler line at the junction 105, the line of the second heat source 64 also branches off from the LT cooler line at the junction 105, and a one-way valve 106 is arranged between the junction 105 and the point 52. The one-way valve 106 allows flow to pass only from the junction 105 to the point 52. Apart from these differences of the connecting line 104 compared to the connecting line 50, the second connection 104 corresponds to the second connection 48.

A one-way valve 107, which allows flow to pass only in the direction from the LT cooler 101 toward the junction 105, is also arranged between the junction 105 and the LT cooler 101.

In all other respects, reference is made to the description of the temperature-control circuit 70 from FIG. 6.

This exemplary embodiment makes it possible to lower the inlet temperature of the condenser 3 and the second heat source 64.

Figure 16:
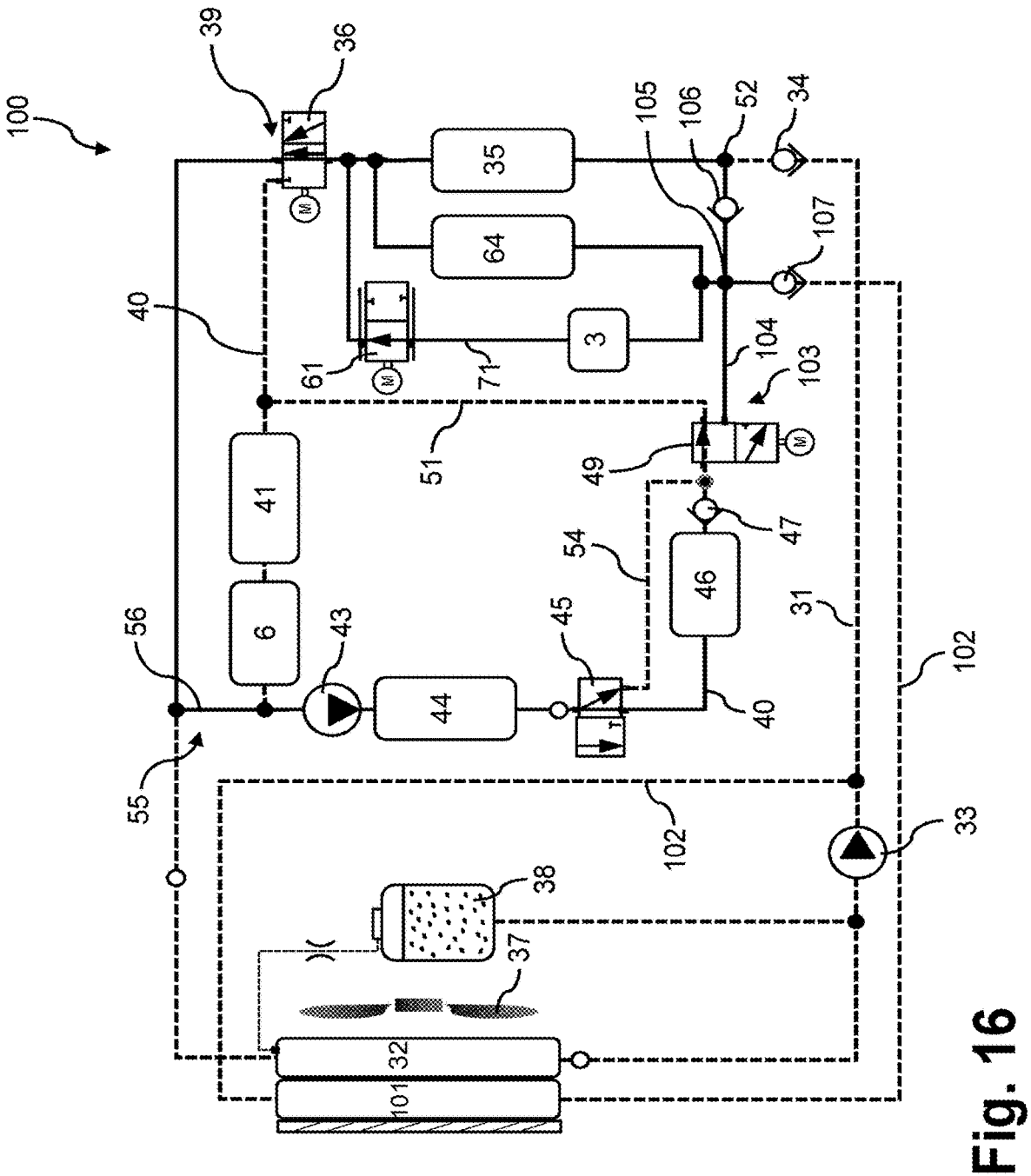
FIG. 16 shows a first operating state of the temperature-control circuit 100 from FIG. 15.

FIG. 16 shows a first operating state of the temperature-control circuit 100 from FIG. 15.

This first operating state of the temperature-control circuit 100 represents a heating operating mode. Here, the cooler circuit pump 33 is not active, and a backflow through the two coolers 32 and 101 is prevented by the one-way valves 34 and 107. In terms of the functioning, the first operating state otherwise corresponds to the first operating state illustrated in FIG. 7.

Figure 17:
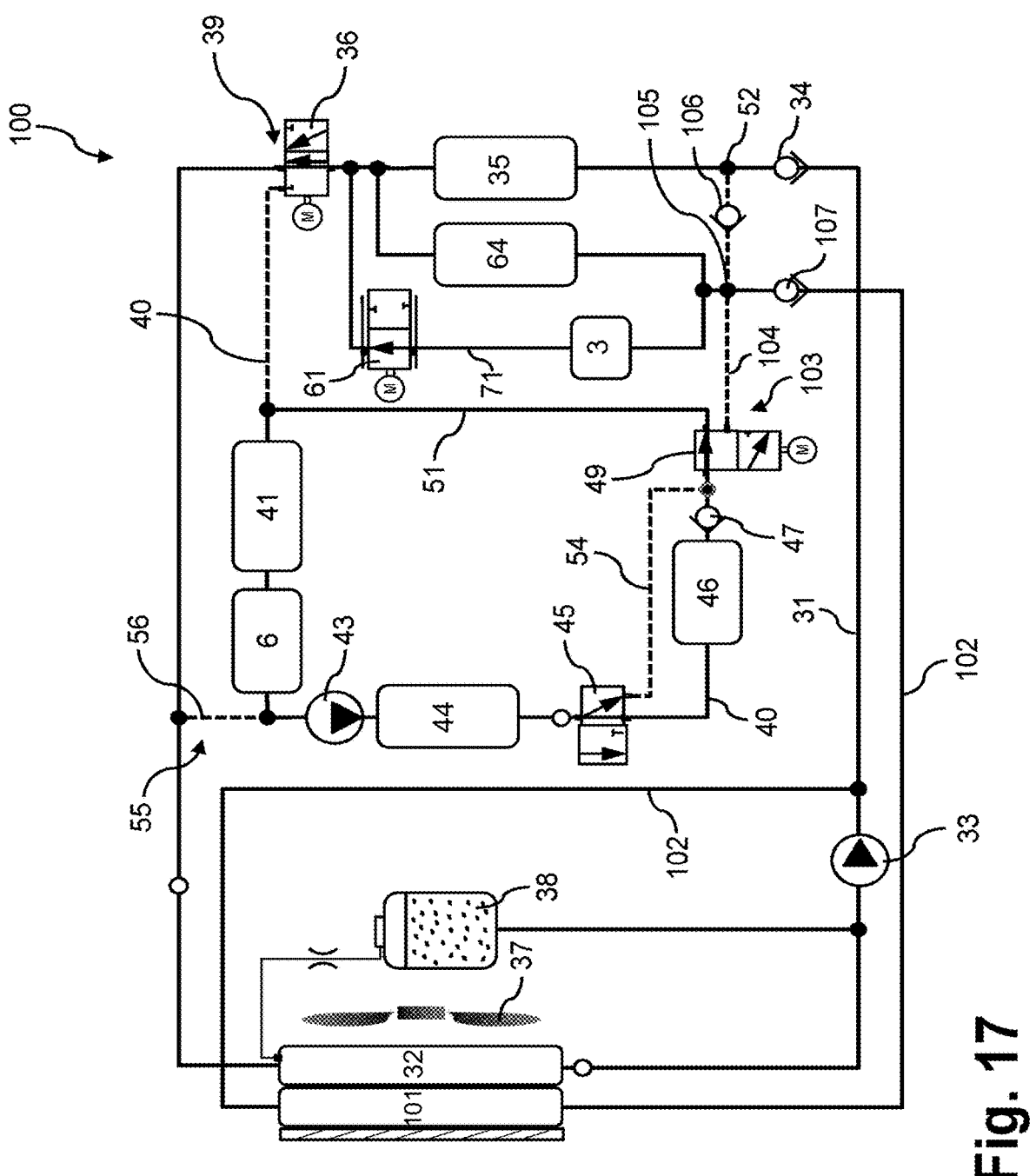
FIG. 17 shows a second operating state of the temperature-control circuit 100 from FIG. 15.

As already mentioned, in FIGS. 16 and 17 coolant flows through each of the coolant lines illustrated as solid lines and flow does not pass through the coolant lines illustrated with dashed lines.

FIG. 17 shows a second operating state of the temperature-control circuit 100 from FIG. 15.

This second operating state of the temperature-control circuit 100 represents a cooling operating mode. Here, the cooler circuit pump 33 is active. The one-way valve 106 prevents undesirable flow from the point 52 to the condenser line 71 and/or the second heat source 64, since a higher pressure prevails at point 52 than at the junction 105 owing to the cooler circuit pump 33 and the pressure loss through the LT cooler 101.

This second operating state substantially corresponds to the operating state illustrated in FIG. 9, wherein, by contrast thereto, flow passes through the two coolers 32 and 101; as already mentioned, this leads to a lower inlet temperature of the condenser 3 and the second heat source 64.

Figure 18:
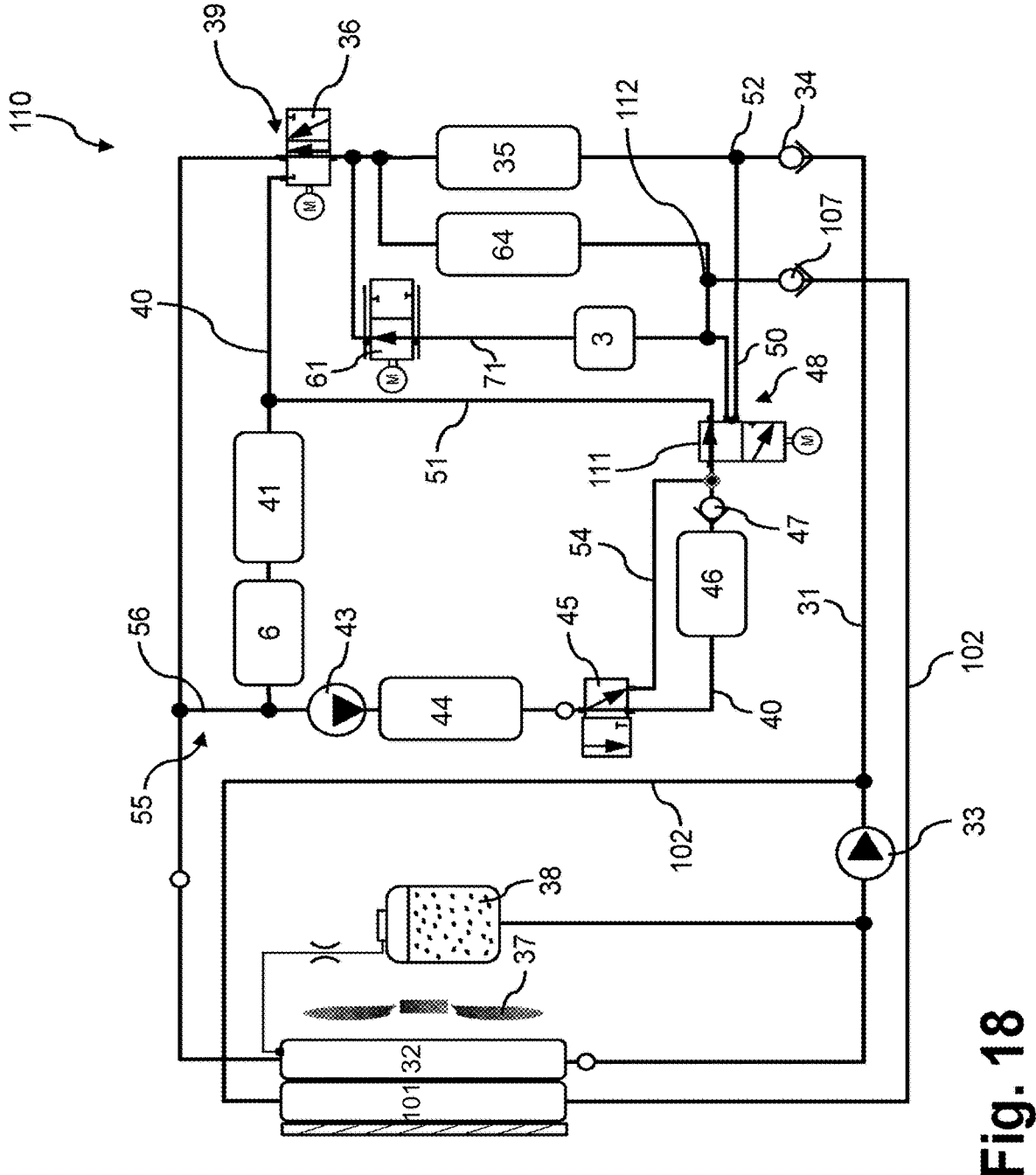
FIG. 18 shows a temperature-control circuit 110 according to a sixth exemplary embodiment of the invention.

FIG. 18 shows a temperature-control circuit 110 according to a sixth exemplary embodiment of the present disclosure. In this exemplary embodiment, only the differences in relation to the temperature-control circuit 100 according to the fifth exemplary embodiment from FIG. 15 will be discussed and in other respects reference is made to the description of that exemplary embodiment.

A second valve device 111 differs from the second valve device 49 in that two separate lines are attached to one of the valve ports. In a first switching position of the second valve device 111, this valve port is inactive, or shut off, so that the two lines are also separated from one another at the second valve device 111. In a second switching position, the second valve device 111 connects the one-way valve 47 and the battery bypass line 54 to both of these separate lines. Here, one of the lines is the connecting line 50 and the other line leads to a junction 112 from which the condenser line 71 with respect to which the second heat source 64 is connected in parallel extends.

By contrast to FIG. 15, the LT cooler line 102 leads into the junction 112. The one-way valve 106 from FIG. 15 can therefore be omitted. An undesirable flow in the cooling operating mode from point 52 via the connecting line 50 to the condenser line 71 and/or the second heat source 64 is stopped by the second valve device 111.

Figure 19:
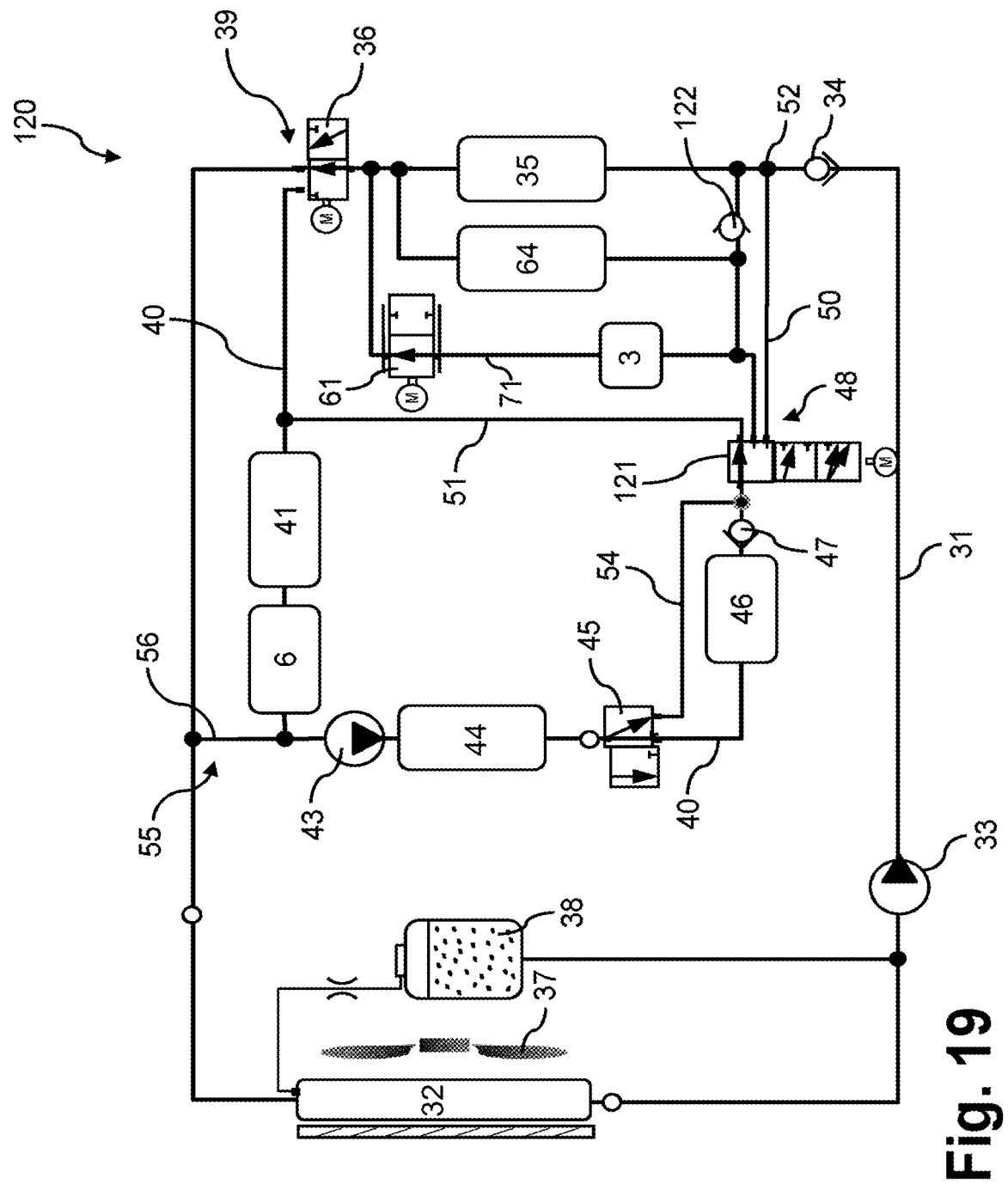
FIG. 19 shows a temperature-control circuit 120 according to a seventh exemplary embodiment of the invention.

FIG. 19 shows a temperature-control circuit 120 according to a seventh exemplary embodiment of the present disclosure. As regards this exemplary embodiment, only the differences in relation to the temperature-control circuit 70 according to the second exemplary embodiment from FIG. 6 will be described. In all other respects, reference is made to the description of that exemplary embodiment.

By contrast to the temperature-control circuit 70, the temperature-control circuit 120 has a second valve device 121, which differs from the second valve device 49 in that it has three switching positions. The connecting line 50 extends between the second valve device 121 and the point 52. The parallel connection of the condenser line 71 and the second heat source 64 leads from the second valve device 121 to the first connection 39. A one-way valve 122 is provided between that side of this parallel connection that is attached to the second valve device 121 and the point 52.

In a first switching position of the second valve device 121, a flow of coolant from the traction battery 46 or the battery bypass line 54 is conducted into the circulation line 51, so that for example the battery cooling circuit 53 is formed. A flow of coolant from the second valve device 121 into the condenser line 71, to the second heat source 64 and into the connecting line 50 is prevented.

In a second switching position of the second valve device 121, a flow of coolant from the second valve device 121 into the circulation line 51 is prevented, a flow of coolant into the condenser line 71 and to the second heat source 64 is allowed, and a flow of coolant into the connecting line 50 is prevented.

In a third switching position of the second valve device 121, a flow of coolant from the second valve device 121 into the circulation line 51 is prevented, a flow of coolant into the condenser line 71 and to the second heat source 64 is allowed, and a flow of coolant into the connecting line 50 is also allowed.

Figure 20:
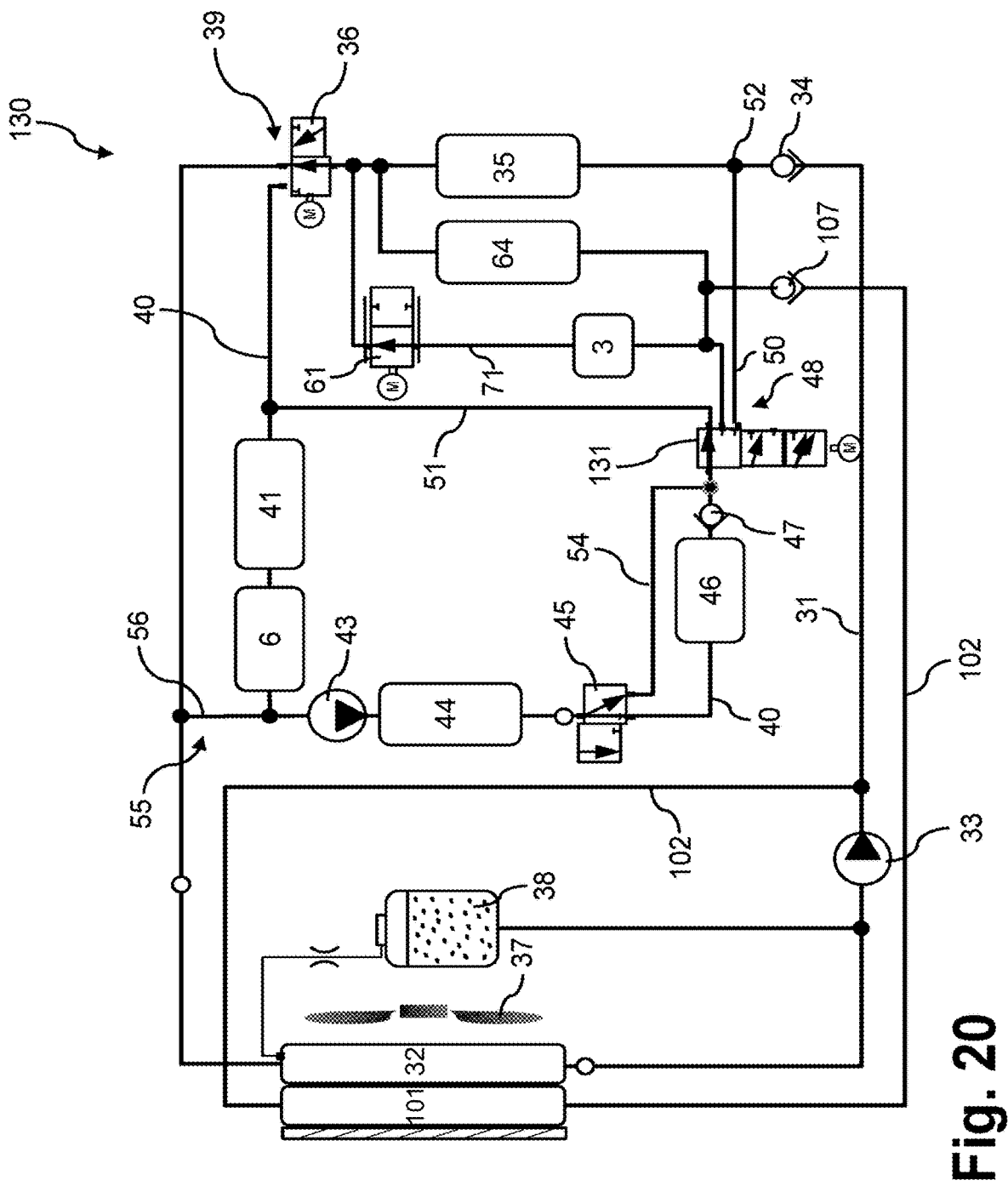
FIG. 20 shows a temperature-control circuit 130 according to an eighth exemplary embodiment of the invention.

FIG. 20 shows a temperature-control circuit 130 according to an eighth exemplary embodiment of the present disclosure. As regards this exemplary embodiment, only the differences in relation to the temperature-control circuit 110 according to the sixth exemplary embodiment from FIG. 18 will be explained and in all other respects, reference is made to the description of that exemplary embodiment.

The temperature-control circuit 130 has a second valve device 131, which differs from the second valve device 111 in that it has three switching positions instead of two.

In a first switching position of the second valve device 131, a flow of coolant from the traction battery 46 or the battery bypass line 54 is conducted into the circulation line 51, so that for example the battery cooling circuit 53 is formed. A flow of coolant from the second valve device 131 into the condenser line 71, to the second heat source 64 and into the connecting line 50 is prevented.

In a second switching position of the second valve device 131, a flow of coolant from the second valve device 131 into the circulation line 51 is prevented, a flow of coolant into the condenser line 71 and to the second heat source 64 is allowed, and a flow of coolant into the connecting line 50 is prevented.

In a third switching position of the second valve device 131, a flow of coolant from the second valve device 131 into the circulation line 51 is prevented, a flow of coolant into the condenser line 71 and to the second heat source 64 is allowed, and a flow of coolant into the connecting line 50 is also allowed.

Figure 21:
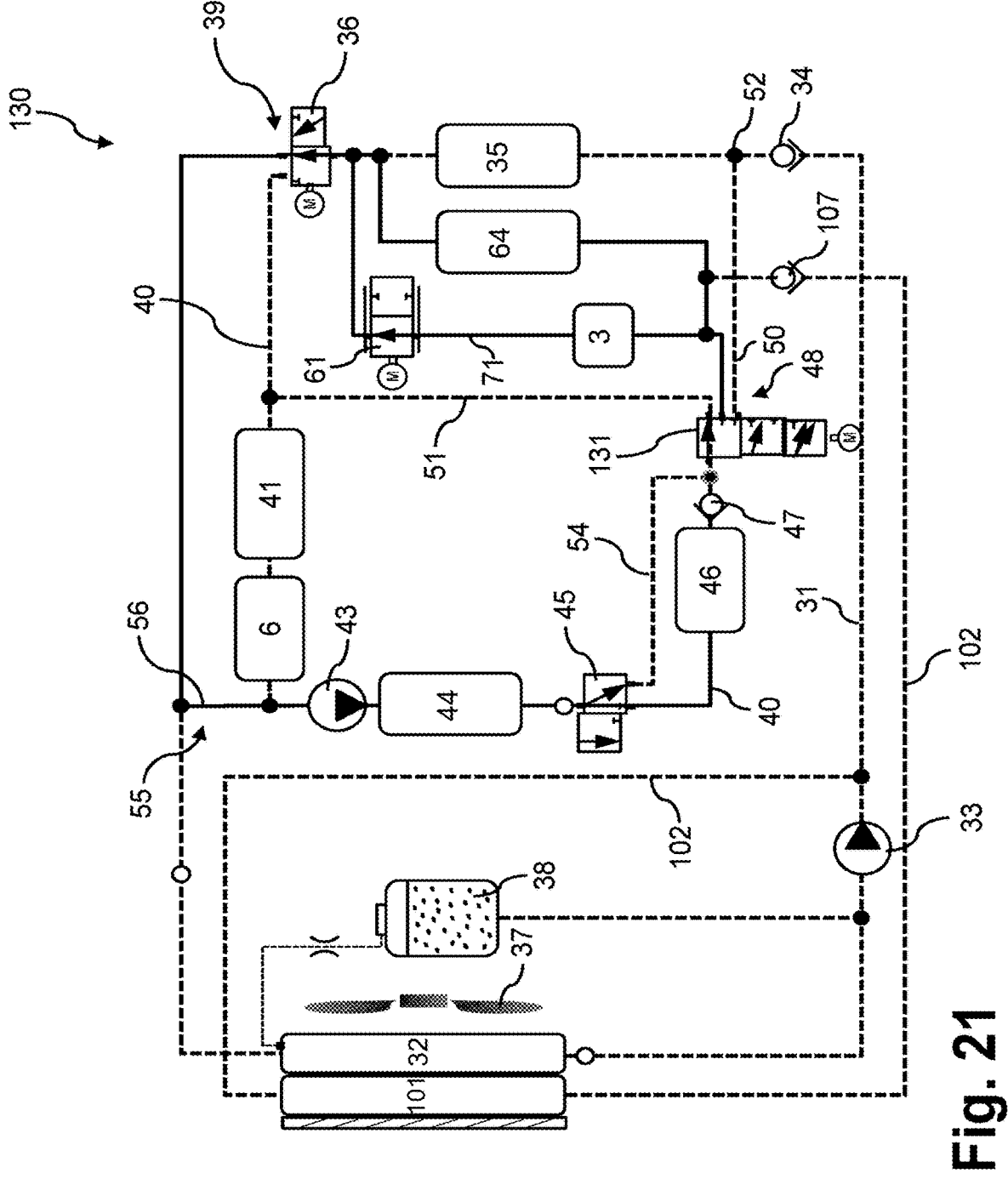
FIG. 21 shows an operating state of the temperature-control circuit 130 from FIG. 20 according to the eighth exemplary embodiment.

FIG. 21 illustrates an operating state of the temperature-control circuit 130 from FIG. 20. As already mentioned, in FIG. 21 coolant flows through each of the coolant lines illustrated as solid lines and flow does not pass through the coolant lines illustrated with dashed lines.

In this operating state, the cooler circuit pump 33 is not active. By shutting off the connecting line 50, a flow through the first heat source 35 is prevented. This is expedient in particular when the first heat source 35 does not set a volumetric flow requirement and also does not generate any heating power. In this way, the heating power of the condenser 3 and the second heat source 64 can be targetedly supplied to the traction battery 46 or the chiller 6, so that the thermal mass of the first heat source 35 does not need to be heated. In addition, this affords hydraulic advantages, since flow does not need to pass through the first heat source 35, this resulting in better efficiency, a higher volumetric flow via the condenser line 71 and the second heat source 64, or smaller dimensions of the battery pump 43.

Figure 22:
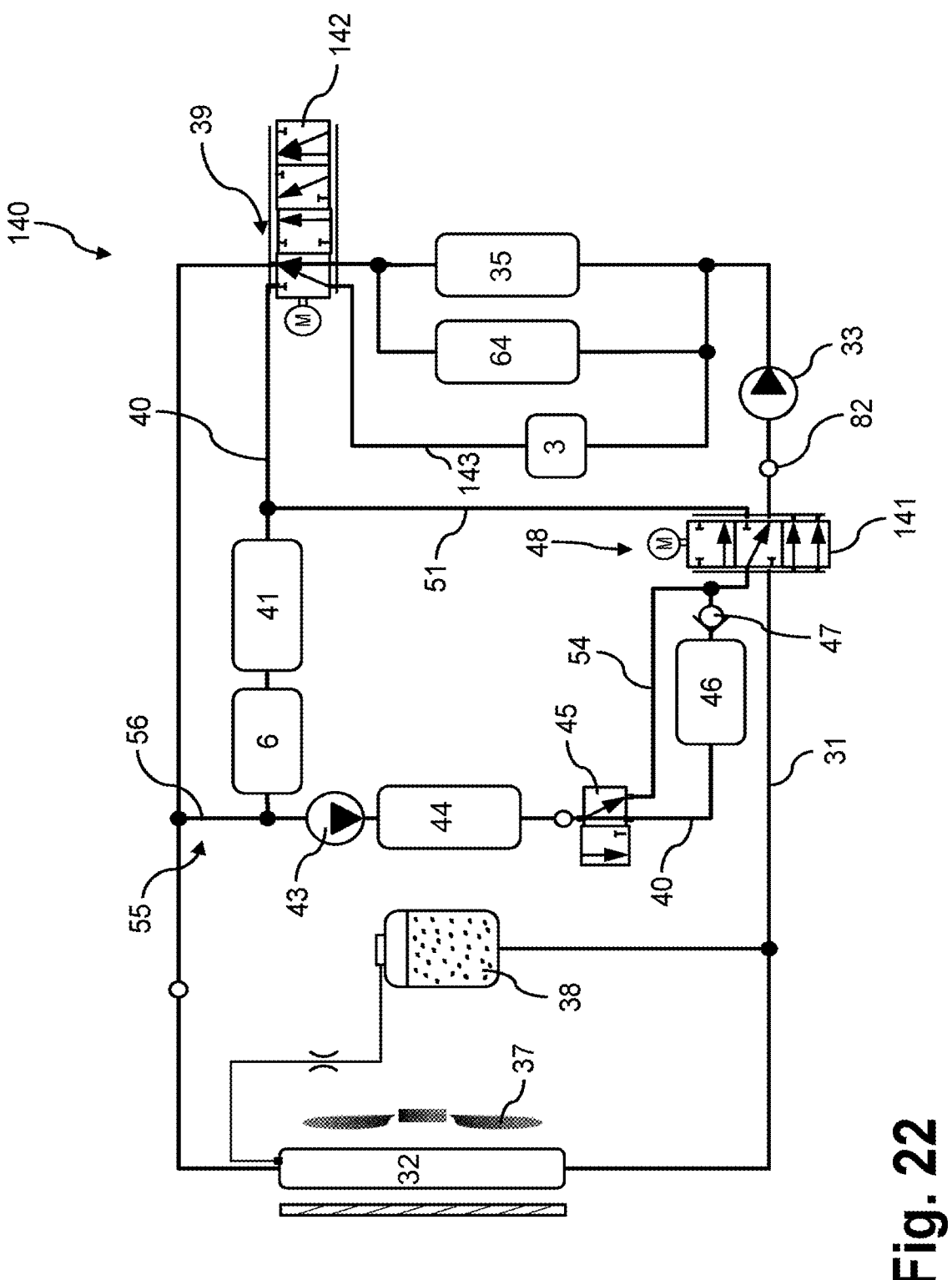
FIG. 22 shows a temperature-control circuit 140 according to a ninth exemplary embodiment of the invention.

FIG. 22 shows a temperature-control circuit 140 according to a ninth exemplary embodiment of the present disclosure. As regards this exemplary embodiment, only the differences in relation to the temperature-control circuit 80 according to the third exemplary embodiment from FIG. 13 will be explained and in all other respects reference is made to the description of that exemplary embodiment.

Like the temperature-control circuit 80, the temperature-control circuit 140 also only has a second valve device 141 and does not have a connecting line 50 at the second connection 48. In this respect, the second valve device 141 differs from the second valve device 81 in that the second valve device 141 has a third switching position in addition to the two described switching positions of the second valve device 81. The placement of the second valve device 141 in the battery cooling circuit 53 corresponds to that of the second valve device 81.

In the third switching position of the valve device 141, the battery cooling circuit 53 is interrupted, that is, the stream of coolant coming from the battery bypass line 54 or the traction battery 46 is blocked. At the same time, the cooler circuit 31 is formed, that is, the stream of coolant coming from the cooler 32 is conveyed to the parallel connection of the condenser line 71, the first heat source 35 and the second heat source 64.

Another difference of the temperature-control circuit 140 in comparison with the temperature-control circuit 80 is that, in the temperature-control circuit 140, the condenser line valve 61 and the first valve device 36 of the temperature-control circuit 80 are combined to form the first valve device 142. That is, the first valve device 142 of the temperature-control circuit 140 allows the same connections and functionalities as the condenser line valve 61 and the first valve device 36 together, for which the valve device 142 has at least four switching positions. The first valve device 142 is arranged at the first connection 39.

By merging the valves, a condenser line 143 has the condenser 3, but no longer has a condenser line valve. At one end, the condenser line 143 is connected to an inlet side of the first heat source 35 and the second heat source 64. The other end of the condenser line 143 is attached directly to an inlet port of the first valve device 142. An outlet side of the first heat source 35 and the second heat source 64 is attached to an inlet port separate therefrom. Of two outlet ports of the valve device 142, one is attached to the battery line 40 and the other conveys the coolant along the cooler circuit 31 to the third connection 55.

The first valve device 142 can be used instead of the condenser line valve 61 and the first valve device 36 in all the exemplary embodiments described above.

The operating states explained in this description are not exhaustive and those skilled in the art will certainly be able to take the switching diagram shown and the functionality of the thermal management system as a basis for advantageously utilizing further operating modes.

While the invention has been depicted and described in detail in the drawings and the description above, this description is to be understood as exemplary and non-limiting and the intention is not to limit the invention to the exemplary embodiments disclosed. The simple fact that certain features are stated in different dependent claims is not intended to mean that it would not also be possible to advantageously utilize a combination of these features.

LIST OF REFERENCE SIGNS

1 Refrigerating circuit
2 Refrigerant compressor
3 Condenser
4 Liquid collector
5 Air-conditioning evaporator
6 Chiller
7 Internal heat exchanger
8 Evaporator valve
9 Chiller valve
10 One-way valve
11 Air-conditioning unit 12 Pressure-temperature sensor
13 Pressure-temperature sensor
14 Refrigerating circuit
15 Heating condenser
16 Temperature sensor
17 Pressure-temperature sensor
18 Refrigerating circuit
19 First valve
20 Return line
21 Second valve
22 Main circuit
23 Refrigerating circuit
24 Non-return valve
25 Bypass line
26 Bypass valve
27 Return line
30 Temperature-control circuit
31 Cooler circuit
32 Cooler
33 Cooler circuit pump
34 One-way valve
35 First heat source
36 First valve device
37 Fan
38 Coolant expansion tank
39 First connection
40 Battery line
41 Third heat source
43 Battery pump
44 Fourth heat source
45 Battery bypass valve
46 Traction battery
47 One-way valve
48 Second connection
49 Second valve device
50 Connecting line
51 Circulation line
52 Point
53 Battery cooling circuit
54 Battery bypass line
55 Third connection
56 Connecting line
58 Condenser line pump
59 Electric heater
60 Heating heat exchanger
61 Condenser line valve
62 Return line
63 One-way valve
64 Second heat source
65 Temperature sensor
66 Temperature sensor
67 Temperature sensor
70 Temperature-control circuit
71 Condenser line
80 Temperature-control circuit
81 Second valve device
82 Temperature sensor
90 Temperature-control circuit
91 Chiller bypass valve
92 Chiller bypass line
100 Temperature-control circuit
101 LT cooler
102 LT cooler line
103 First connection
104 Connecting line
105 Junction
106 One-way valve 107 One-way valve
110 Temperature-control circuit
111 Second valve device
112 Junction
120 Temperature-control circuit
121 Second valve device
122 One-way valve
130 Temperature-control circuit
131 Second valve device
140 Temperature-control circuit
141 Second valve device
142 First valve device
143 Condenser line

The invention claimed is:

1. A thermal management system for a motor vehicle, comprising:
   a cooler circuit which connects a cooler, a cooler circuit pump, and a first heat source in series;
   a battery line, which connects a chiller and a traction battery in series, wherein a refrigerant circuit flows through the chiller fluidically separately from the battery line;
   a first connection, which is arranged in the cooler circuit downstream of the first heat source and upstream of the cooler, wherein coolant is introduced selectively into the battery line at the first connection by a first valve device;
   a second connection, which leads from the battery line to a point of the cooler circuit downstream of the cooler and upstream of the first heat source, which has a second valve device to which selectively the battery line and the cooler circuit are fluidically connected and/or the chiller and the traction battery are connected to form a ring-like battery circuit; and
   a third connection between the battery line and the cooler circuit, wherein the chiller is arranged in the battery line between the first connection and the third connection; and
   a condenser line, which extends between the second connection and the first connection, wherein the condenser line comprises a condenser, and the refrigerant circuit also flows through the condenser fluidically separately from the condenser line;
   wherein the condenser is a liquid-cooled condenser and the condenser line circumvents the first heat source and is connected in parallel with respect to the first heat source; and,
   wherein the condenser line is a dedicated line of the cooler circuit that branches off from the cooler circuit at the second connection and rejoins the cooler circuit at the first connection, bypassing the first heat source within the cooler circuit.

2. The thermal management system according to claim 1, wherein a flow through the condenser line is set by a flow control valve or the first valve device.

3. The thermal management system according to claim 1, comprising:
   a line which extends parallel to the condenser line between the second connection and the first connection, circumventing the first heat source, wherein a second heat source is arranged in this further line.

4. The thermal management system according to claim 1, wherein the battery line has a heat source between the first connection and the chiller.

5. The thermal management system according to claim 1, wherein the battery line has a heat source between the third connection and the traction battery.

6. The thermal management system according to claim 1, wherein a heating heat exchanger is arranged in the condenser line.

7. The thermal management system according to claim 1, comprising:
   a battery bypass line, within and fluidically part of the battery line, which branches off from the battery line, circumvents the traction battery and leads back into the battery line.

8. The thermal management system according to claim 1, comprising:
   a chiller bypass line, within and fluidically part of the battery line, which branches off from the battery line upstream of the chiller and leads back into the battery line downstream of the chiller.

9. The thermal management system according to claim 1, wherein the second connection also has a connecting line, which is attached directly to the second valve device and leads to that point of the cooler circuit that is downstream of the cooler and upstream of the first heat source.

10. The thermal management system according to claim 9, comprising:
   a LT cooler, a feed line of which branches off from the cooler circuit and the discharge line of which opens into the connecting line, wherein a one-way valve which prevents a flow from the cooler circuit into the connecting line is arranged in the connecting line between this opening and the cooler circuit.

11. The thermal management system according to claim 9, wherein the condenser line branches off from the connecting line.

12. The thermal management system according to claim 9, wherein the condenser line is attached directly to the second valve device, and the second valve device has a switching position in which the connecting line and the condenser line are shut off at a same time.

13. The thermal management system according to claim 9,
   wherein the second valve device has at least three switching positions,
   wherein:
      in a first switching position, the chiller and the traction battery can be connected to form the closed-ring battery circuit,
      in a second switching position, the battery line is fluidically connected to the condenser line and the connecting line is shut off, and,
      in a third switching position, the battery line is fluidically connected to the condenser line and the connecting line at the same time.

14. A motor vehicle comprising:
   the thermal management system according to claim 1.

* * * * *